(12) United States Patent
Lee et al.

(10) Patent No.: US 12,223,871 B2
(45) Date of Patent: Feb. 11, 2025

(54) DISPLAY DEVICE AND METHOD OF COMPENSATING FOR DETERIORATION THEREOF, AND MOBILE TERMINAL INCLUDING THE DISPLAY DEVICE

(71) Applicant: LG Display Co., Ltd., Seoul (KR)

(72) Inventors: Dong Gun Lee, Seoul (KR); Seung Taek Oh, Seoul (KR); Yong Kyun Choi, Seoul (KR); Jung Hoon Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/208,105

(22) Filed: Jun. 9, 2023

(65) Prior Publication Data
US 2024/0144848 A1    May 2, 2024

(30) Foreign Application Priority Data

Oct. 28, 2022  (KR) ......................... 10-2022-0141080

(51) Int. Cl.
*G09G 3/00*  (2006.01)
*G06V 40/13*  (2022.01)
*G09G 3/3233*  (2016.01)

(52) U.S. Cl.
CPC ........... *G09G 3/035* (2020.08); *G09G 3/3233* (2013.01); *G06V 40/1318* (2022.01); *G09G 2300/0439* (2013.01); *G09G 2300/0819* (2013.01); *G09G 2300/0842* (2013.01); *G09G 2310/08* (2013.01); *G09G 2320/0233* (2013.01); *G09G 2320/045* (2013.01); *G09G 2320/0673* (2013.01); *G09G 2330/12* (2013.01); *G09G 2354/00* (2013.01); *G09G 2360/145* (2013.01)

(58) Field of Classification Search
CPC ................ G09G 3/035; G09G 3/3233; G09G 2300/0439; G09G 2300/0819; G09G 2300/0842; G09G 2320/0233; G09G 2320/045; G09G 2320/0673; G09G 2310/08; G09G 2330/12; G09G 2354/00; G09G 2360/145; G06V 40/1318
USPC .................................................. 345/207, 76
See application file for complete search history.

(56) References Cited

U.S. PATENT DOCUMENTS

| | | | |
|---|---|---|---|
| 11,543,919 B2 | 1/2023 | Han et al. | |
| 2022/0067340 A1* | 3/2022 | Han | G06V 40/1365 |
| 2022/0101798 A1* | 3/2022 | Jung | G09G 3/3275 |

FOREIGN PATENT DOCUMENTS

| | | |
|---|---|---|
| KR | 10-2021-0083611 A | 7/2021 |
| KR | 10-2022-0030004 A | 3/2022 |

\* cited by examiner

*Primary Examiner* — Jimmy H Nguyen
(74) *Attorney, Agent, or Firm* — Morgan, Lewis & Bockius LLP

(57) ABSTRACT

The present disclosure relates a display device and a method compensating for deterioration thereof, and a mobile terminal including the display device. The display device includes: a display panel including a first pixel area, a second pixel area, and a third pixel area; a first optical device disposed below the display panel or embedded within the display panel in a predetermined sensing area on the display panel, the first optical device facing at least a portion of the first pixel area and a portion of the second pixel area when the display panel is folded or moved; and a pixel deterioration compensation circuit configured to operate to reduce a luminance difference between the first pixel area and the second pixel area by receiving sensing data from the first optical device in a deterioration sensing mode.

19 Claims, 25 Drawing Sheets

[Sensing Data]

[Initial NML Digital Gamma]

| Digital Gamma | Red | Green | Blue |
|---|---|---|---|
| G31 | 100 | 150 | 120 |
| G63 | 300 | 400 | 350 |
| G127 | 700 | 800 | 740 |
| G255 | 1500 | 1800 | 1620 |

[NML Digital Gamma Gamma after compensation]

| Digital Gamma | Red | Green | Blue |
|---|---|---|---|
| G31 | 100+20 | 150+25 | 120+30 |
| G63 | 300+45 | 400+50 | 350+55 |
| G127 | 700+100 | 800+120 | 740+140 |
| G255 | 1500+150 | 1800+180 | 1620+200 |

[Initial UDC Digital Gamma]

| Digital Gamma | Red | Green | Blue |
|---|---|---|---|
| G31 | 400 | 600 | 480 |
| G63 | 1200 | 1600 | 1400 |
| G127 | 2800 | 3200 | 3000 |
| G255 | 6000 | 7200 | 6800 |

[NML Digital Gamma Gamma after compensation]

| Digital Gamma | Red | Green | Blue |
|---|---|---|---|
| G31 | 400+80 | 600+100 | 480+120 |
| G63 | 1200+160 | 1600+200 | 1400+240 |
| G127 | 2800+400 | 3200+450 | 3000+500 |
| G255 | 6000+600 | 7200+700 | 6800+800 |

DISPLAY DEVICE AND METHOD OF COMPENSATING FOR DETERIORATION THEREOF, AND MOBILE TERMINAL INCLUDING THE DISPLAY DEVICE

CROSS-REFERENCE TO RELATED APPLICATION

This application claims priority to and the benefit of Korean Patent Application No. 10-2022-0141080, filed Oct. 28, 2022, the disclosure of which is incorporated herein by reference in its entirety.

BACKGROUND

1. Technical Field

The present disclosure relates to a display device and a method of compensating for a difference in luminance between pixels of areas with different pixel densities, and a mobile terminal including the display device.

2. Discussion of the Related Art

Electroluminescent display devices are generally classified into inorganic light emitting display devices and organic light emitting display devices according to the materials of light emitting layers. Active matrix type organic light emitting display devices include organic light-emitting diodes (hereinafter referred to as "OLEDs"), which emit light by themselves, and have fast response speeds and advantages in which light emission efficiencies, brightness, and viewing angles are high.

In the organic light-emitting display devices, the OLEDs are formed in pixels. Since the organic light-emitting display devices have fast response speeds and are excellent in light emission efficiency, brightness, and viewing angle as well as being able to exhibit a black gradation in a full black color, the organic light-emitting display devices are excellent in a contrast ratio and color reproducibility.

Multimedia capabilities of mobile terminals have been improved. For example, cameras are being built into smartphones by default, their resolution is increasing to the level of conventional digital cameras, and biometrics using optical devices are being applied. Front cameras in the smartphones restricts a screen design, making it difficult to design the screen. The screen design with notches or punch holes have been adopted in the smartphones to reduce the space taken up by the cameras, but the camera still limits the size of the screen, making it impossible to realize a full-screen display.

SUMMARY

In order to implement a full-screen display, a camera module may be disposed to overlap the screen of a display panel. In some of display areas of the screen that overlap the camera module, the pixel density or pixels per inch (PPI) may be lowered to increase transmittance. In this case, a luminance difference may occur between high PPI and low PPI regions. To address this issue, although a difference in luminance may be reduced by varying data voltages between pixel areas with different pixel densities, a difference in deterioration degrees of pixels between the pixel areas may increase over time. Although a pixel deterioration compensation algorithm may be applied by predicting the deterioration based on the usage frequency of the pixels in each pixel areas, the difference between an actual deterioration value and a predicted deterioration value may cause the pixel deterioration compensation to be inaccurate.

The present disclosure has been made to address aforementioned problems and/or drawbacks.

Accordingly, embodiments of the present disclosure are directed to a display device, a method of compensating for deterioration thereof, and a mobile terminal including the display device that substantially obviate one or more of the problems due to limitations and disadvantages of the related art.

An aspect of the present disclosure is to provide a display device capable of accurately compensating for a luminance difference between pixel areas with different pixel densities due to pixel deterioration degree difference, and a deterioration compensation method thereof, and a mobile terminal including the display device.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display device comprises: a display panel including a first pixel area, a second pixel area, and a third pixel area; a first optical device disposed below the display panel or embedded within the display panel in a predetermined sensing area on the display panel, the first optical device facing at least a portion of the first pixel area and a portion of the second pixel area when the display panel is folded or moved to a predetermined position; and a pixel deterioration compensation circuit configured to operate to reduce a luminance difference between the first pixel area and the second pixel area by receiving sensing data from the first optical device in a deterioration sensing mode.

A pixel density or pixels per inch (PPI) of the second pixel area may be lower than the pixel density or PPI of the first pixel area. The maximum data voltage applied to the pixels in the second pixel area may be higher than the maximum data voltage applied to the pixels in the first pixel area.

The display device may further include a second optical device disposed below the display panel to overlap the second pixel area.

The third pixel area of the display panel may overlap the sensing area. At least some pixels in the third pixel area may emit light when a fingerprint recognition event occurs. None of the pixels in the third pixel area may emit light in the deterioration sensing mode.

The display panel may enter the deterioration sensing mode in a folded state. The sensing data outputted from the first optical device may have a luminance value of each of the first and second pixel areas.

The display panel may be wound on a roller. Rotation of the roller may cause the display panel to move so that the luminance value of each of the first and second pixel areas is measured by the first optical device as the first and second pixel areas to predetermined positions where the first area or the second pixel area facing the sensing area.

In a display mode, pixel data of an input image may be written to the pixels in the first pixel area, the second pixel area, and the third pixel area so that the input image is displayed on the display panel. In the deterioration sensing mode, the pixels in the first pixel area and the second pixel area may be written with predetermined display pattern data regardless of the input image so that the pixels of the first pixel area and the second pixel area emit light.

The pixel deterioration compensation circuit may include: a luminance measurement part configured to measure the luminance difference between the first pixel area and the second pixel area based on the sensing data inputted from the first optical device; and a gamma correction part configured to derive a compensation value corresponding to the luminance difference between the first pixel area and the second pixel area, and update digital gamma data by adding the compensation value to initial gamma compensation data.

The gamma correction part may modulate pixel data of the input image into the digital gamma data.

The display device may further include: a data driver configured to convert the pixel data modulated by the gamma correction part into a data voltage. A maximum voltage of the data voltage to be applied to the pixels in the second pixel area may be higher than a maximum voltage of the data voltage to be applied to the pixels in the first pixel area.

In another aspect, a method of compensating for deterioration of a display device comprises: driving pixels in a first pixel area and pixels in a second pixel area by writing display pattern data to the pixels while a display panel is folded; driving an optical device disposed in a sensing area opposite the first pixel area and the second pixel area to measure a luminance difference between the first pixel area and the second pixel area from sensing data outputted from the optical device; deriving a compensation value that reduces the luminance difference between the first pixel area and the second pixel area, and updating digital gamma data of at least one of the first pixel area and the second pixel area using the compensation value; after updating the digital gamma data, driving the pixels by writing the display pattern data to the pixels to re-measure the luminance difference between the first pixel area and the second pixel area from sensing data outputted from the optical device; and comparing the luminance difference between the first pixel area and the second pixel area with a predetermined allowable value.

In another aspect, a mobile terminal comprises: a display panel including a first pixel area, a second pixel area, and a third pixel area; a first optical device disposed below the display panel or embedded within the display panel, the first optical device being disposed within a sensing area that faces at least a portion of the first pixel area and a portion of the second pixel area when the display panel is folded or moved to a predetermined position; a display panel driver configured to write pixel data of an input image to pixels in the first pixel area, the second pixel area, and the third pixel area of the display mode; a pixel deterioration compensation circuit configured to operate in a deterioration sensing mode and receive sensing data outputted from the first optical device to reduce a luminance difference between the first pixel area and the second pixel area; and an authentication processor configured to process a user authentication based on fingerprint pattern data received from the first optical device in a fingerprint recognition mode. A luminance value of the first pixel area and a luminance value of the second pixel area in the sensing area are measured by the first optical device.

According to the present disclosure, a full-screen display may be realized because a sensor is disposed in a screen on which an image is displayed.

According to the present disclosure, the luminance difference between the pixel areas may be managed to an allowable value by deriving a compensation value based on the luminance difference between the pixel areas in the display device whose screen size can be varied by using a flexible display panel.

According to the present disclosure, even if the difference in the deterioration degree of the pixels increases as the driving time of the pixels elapses due to the difference between pixel density or PPI. and data voltage, the difference in luminance between the pixel areas may always be reduced below the allowable value.

According to the present disclosure, the image quality and lifetime of the display device and the mobile terminal may be improved by compensating for the difference in the deterioration degree of the pixels between the pixel areas.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
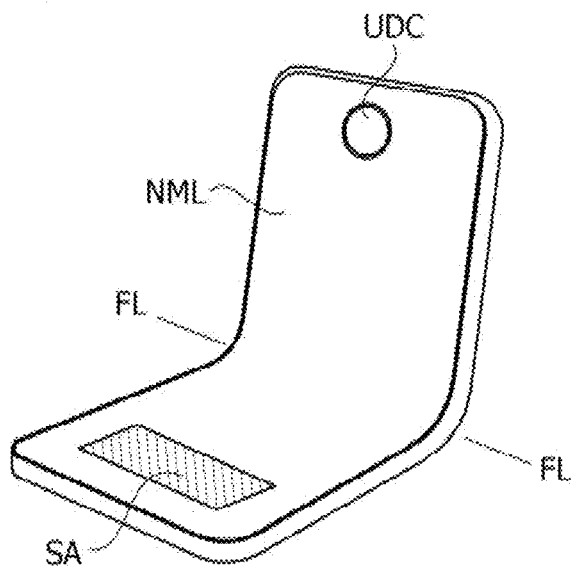
FIG. 1 is a diagram schematically illustrating an appearance of a mobile terminal according to one embodiment of the present disclosure.
Figure 1:
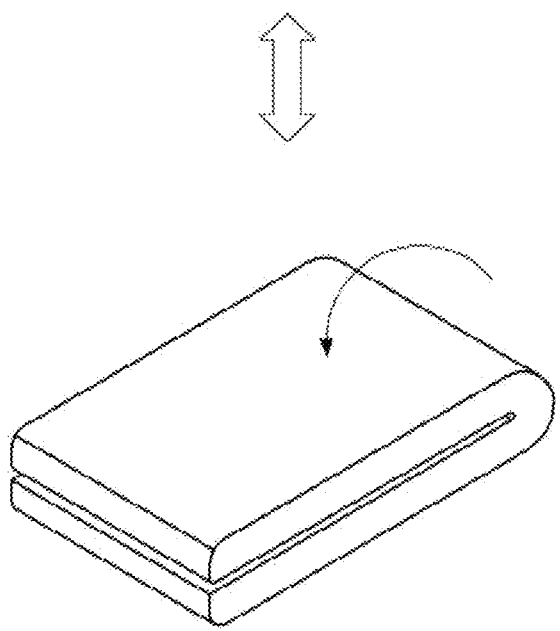

The advantages and features of the present disclosure and methods for accomplishing the same will be more clearly understood from embodiments described below with reference to the accompanying drawings. However, the present disclosure is not limited to the following embodiments but may be implemented in different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When a positional or interconnected relationship is described between two components, such as "on top of," "above," "below," "next to," "connect or couple with," "crossing," "intersecting," or the like, one or more other components may be interposed between them, unless "immediately" or "directly" is used.

When a temporal antecedent relationship is described, such as "after", "following", "next to", "before", or the like, it may not be continuous on a time base unless "immediately" or "directly" is used.

The terms "first," "second," and the like may be used to distinguish components from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

In each display device of the present disclosure, each of the sub-pixels and the gate driving circuit includes a plurality of transistors. Transistors may be implemented as oxide thin film transistors (oxide TFTs) including an oxide semiconductor, low temperature polysilicon (LTPS) TFTs including low temperature polysilicon, or the like. Further, each of the transistors may be implemented as a p-channel TFT or an n-channel TFT.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. A transistor is turned on in response to a gate-on voltage and is turned off in response to a gate-off voltage.

Hereinafter, various embodiments of the present disclosure will be described in detail with reference to the accompanying drawings.

FIG. 1 is a diagram schematically illustrating an appearance of a mobile terminal 1000 according to one embodiment of the present disclosure.

Referring to FIG. 1, a screen of the mobile terminal 1000 may be implemented as a foldable display using a flexible display panel that can be folded at least in part thereof, but is not limited thereto. Hereinafter, a display device of the present disclosure will be described with a foldable display. "Flexible display panel" is abbreviated as "display panel".

The display device includes a display panel on which an input image is reproduced. A display area of the display panel includes a first pixel area NML and a second pixel area UDC. The first pixel area NML and the second pixel area UDC include display pixels into which pixel data of the input image is written to display the input image. Hereinafter, "display pixels" is abbreviated as "pixels". Thus, the flexible display panel may realize a full-screen display in which the input image is reproduced in the first and second pixel areas NML and UDC.

The first pixel area NML occupies the majority of the display area and includes pixels disposed at a high pixel density or PPI. The second pixel area UDC includes pixels disposed at a lower pixel density or PPI than the pixel density or PPI of the first pixel area NML. Embodiments of the present disclosure may be applied even if the pixel density or PPI is the same between the pixel areas. For example, even if pixel density or PPI is the same between pixel areas, there may be differences in luminance characteristics, gamma characteristics, degradation levels, driving history, etc. between the pixel areas, so the embodiments are not limited to differences in pixel density or PPI between the pixel areas.

The mobile terminal 1000 includes a sensing area SA in which the first optical device is disposed. The second pixel area UDC is overlapped with a second optical device disposed below the display panel.

When the display panel is folded, at least a portion of the first pixel area and at least a portion of the second pixel area UDC may be opposed to the sensing area SA. In this case, the luminance of the first pixel area and the luminance of the second pixel area may be measured by the first optical device by entering a deterioration sensing mode. The deterioration sensing mode may be set at a predetermined period of time while the display panel is folded, or may be set by the user.

The first optical device includes sensor pixels, including a photoelectric element, which converts received light into an electrical signal. The first optical device may be disposed within the pixel area of the display panel such that it overlaps the sensing area SA. For example, the sensor pixels may be sensor pixels of an image sensor, an infrared sensor element or an illumination sensor element, and the sensor pixels may be disposed below the display panel or embedded in the form of an in-cell within a third pixel area of the display panel. The third pixel area may include pixels that display a portion of an input image. The PPI of the third pixel area may be the same as or lower than that of the first pixel area NML. When the sensor pixels are disposed below the display panel, the PPI of the third pixel area may be the same as that of the first pixel area NML. When the sensor pixels are embedded in the third pixel area of the display panel, the PPI of the third pixel area may be lower than that of the first pixel area NML and may be equal to that of the second pixel area UDC due to the sensor pixels.

Each of the first and second optical devices may be an optical device, such as an imaging element (or camera) including sensor pixels of an image sensor, an infrared sensor element, an illumination sensor element, etc. The second optical device may include a front camera and/or an infrared sensor, which may be used to capture external photorealistic images or for facial recognition. The second optical device may emit infrared light and photoelectrically convert the infrared light reflected from the user's face when a face recognition event occurs. The first optical device may sense pixel deterioration in the first and second pixel areas based on changes in luminance of the pixels. In addition, the first optical device may be utilized for fingerprint recognition in a fingerprint recognition mode. In other words, the first optical device may be a fingerprint recognition sensor. Each of the first and second optical devices may include a light path conversion element such as prisms, lenses for focusing light onto the image sensor, and the like.

The first optical device may receive light emitted from the pixels in the first pixel area NML and the pixels in the second pixel area UDC within the sensing area, and may photoelectrically convert the light to output sensing data. The display device may include a pixel deterioration compensation circuit that receives the sensing data from the first optical device and reduces the luminance difference between the first pixel area NML and the second pixel area UDC. The pixel deterioration compensation circuit will be described in detail with reference to FIG. 14 and the following drawings.

In a foldable display, the pixel areas activated on the display panel and their resolution may vary depending on the folding direction, folding/unfolding state, and folding angle of the display panel. Devices for sensing the folding direction, folding/unfolding state, and folding angle of a display panel are known from Korean laid-open patent publication 10-2020-0142394 A (Dec. 22, 2020) and U.S. application publication US 2020-0394984 A1 (Dec. 17, 2020).

The foldable display may be folded in an in-folding manner or an out-folding manner. In FIG. 1, "FL" is a rotation center line when the display panel is folded by the foldable mechanical structure of the mobile terminal 1000. The rotation center line FL exists within the first pixel area between the second pixel area UDC and the sensing area SA. In an in-folding method, as shown at the upper right of FIG. 1, when the display panel is folded in a first rotation direction, for example, counterclockwise, the second pixel area UDC and the sensing area SA face each other in the display area of the display panel or inside the display panel where a light emitting surface is folded. In this case, the pixel area is not exposed to the outside and the pixels are not driven. When the display panel is unfolded in a second rotational direction, for example, clockwise, in the unfolding state, the pixels present in at least a portion of the display area are driven to display the input image on the display area.

The present disclosure is applicable to an in-folding type or out-folding type foldable display. When the display panel is folded, the pixels in the second pixel area UDC and a receiving surface of the first optical device may face each other, thereby sensing deterioration of the pixels in the first and second pixel areas NML and UDC.

Figure 2A:
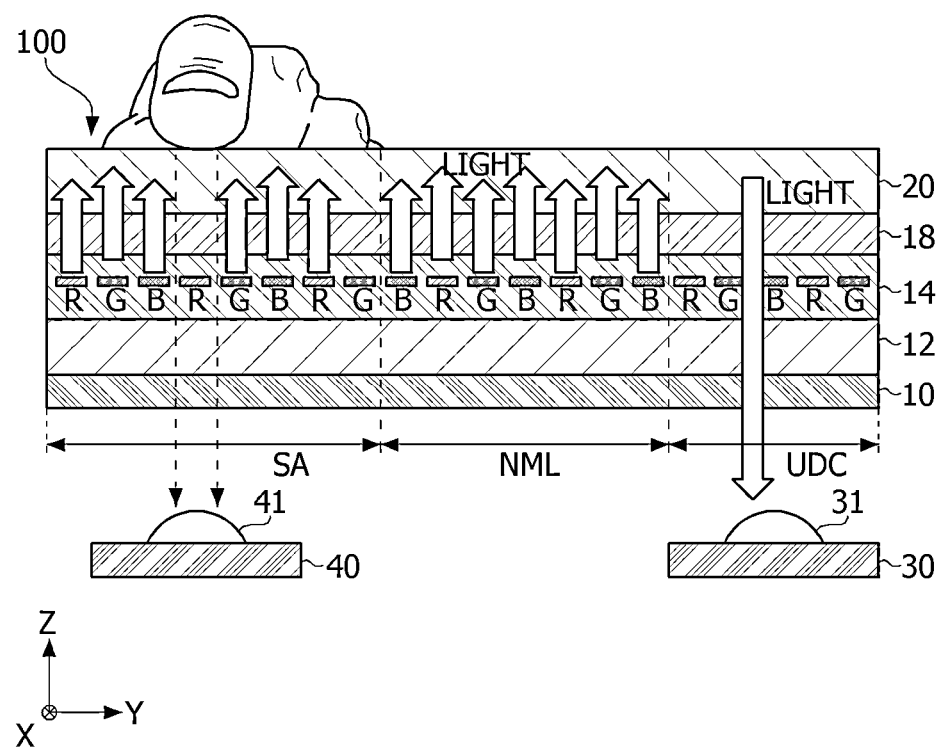
FIGS. 2A and 2B are cross-sectional views illustrating a cross-sectional structure of a display panel according to one embodiment of the present disclosure.
Figure 2B:
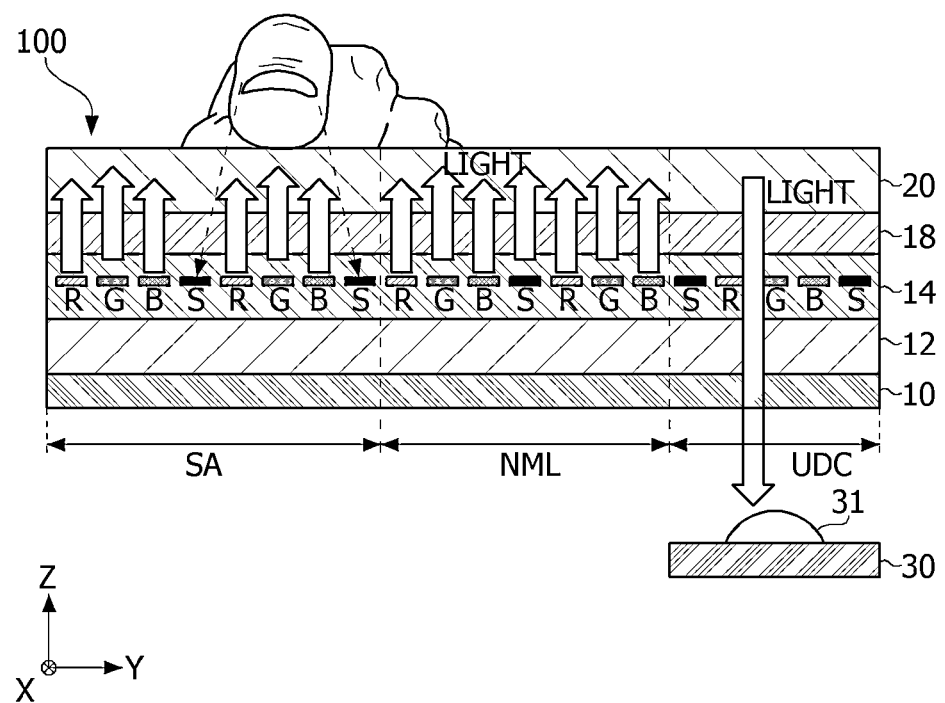

FIGS. 2A and 2B are cross-sectional views illustrating a cross-sectional structure of the display panel.

The display panel 100 may be implemented as a flexible display panel in which pixels P are disposed on a flexible substrate such as a plastic substrate or a metal substrate. In the foldable display, the first pixel area NML of the display panel may be folded at the rotation center line FL within the first pixel area between the second pixel area UDC and the sensing area SA.

Each of the pixels in the pixel areas NML, UDC, and SA of the display panel may include sub-pixels of different colors for color realization of the image. In FIGS. 2A and 2B, pixels R, G, and B may be present in the sensing area SA. In other embodiments, the pixels may not be disposed in the sensing area SA. The sub-pixels include a red sub-pixel (Red, R), a green sub-pixel (Green, G), and a blue sub-pixel (Blue, B). Although not shown, each of the pixels may further include a white sub-pixel. Each of the sub-pixels may include a pixel circuit to drive a light emitting element.

A second optical device 30 is disposed below the display panel 100 such that it overlaps the second pixel area UDC. A lens 31 may be disposed on a receiving surface of the second optical device 30. The first optical device 40 may be disposed below the display panel 100 such that it overlaps the sensing area SA as shown in FIG. 2A. A lens 41 may be disposed on a receiving surface of the first optical device 40. As shown in FIG. 2B, in the display panel 100, a sensor pixel S may be embedded in at least a portion of a circuit layer 12 and a light-emitting element layer 14 in the sensing area SA. In this case, the first optical device 40 disposed on the outside of the display panel 100 may be omitted. The sensor pixel S may include a photoelectric element, such as a photodiode, and a sensor driving circuit to drive the photoelectric element.

The display panel 100 has a width in an X-axis direction, a length in a Y-axis direction, and a thickness in a Z-axis direction. The display panel 100 may include a circuit layer 12 disposed on a substrate and a light emitting element layer 14 disposed on the circuit layer 12. A polarizing plate 18 may be disposed on the light emitting element layer 14, and a cover glass 20 may be disposed on the polarizing plate 18.

The circuit layer 12 may include a pixel circuit connected to wires such as data lines, gate lines, and power lines, and a gate driver connected to the gate lines. The circuit layer 12 may further include sensor circuitry. The circuit elements of the circuit layer 12 may include transistors implemented as thin film transistors TFT, and circuit elements such as capacitors. The wires and the circuit elements of the circuit layer 12 may be implemented with a plurality of insulating layers, two or more metal layers separated with an insulating layer therebetween, and an active layer including a semiconductor material.

The light emitting element layer 14 may include a light emitting element driven by the pixel circuit. The light emitting element may be implemented with an OLED. The light emitting element includes an organic compound layer formed between the anode and the cathode. The organic compound layer may include, but is not limited to, a hole injection layer HIL, a hole transport layer HTL, an emission layer EML, an electron transport layer ETL, and an electron injection layer EIL. When a voltage is applied to the anode and cathode electrodes of the light emitting element, holes passing through the hole transport layer HTL and electrons passing through the electron transport layer ETL are moved to the emitting layer EML to form exciton, and thus visible light is emitted from the emitting layer EML. The light emitting element layer 14 may be disposed on pixels that selectively transmit red, green, and blue wavelengths, and may further include a color filter array. The OLED used as the light-emitting element may have a tandem structure in which a plurality of light-emitting layers are stacked. The OLED having the tandem structure may improve the luminance and lifespan of pixels.

The light emitting element layer 14 may be covered with a protective film and the protective film may be covered with the encapsulation layer. The protective film and the encapsulation layer may have a structure in which an organic film and an inorganic film are alternately stacked. The inorganic film blocks permeation of moisture and oxygen. The organic film planarizes the surface of the inorganic film. When the organic layer and the inorganic layer are stacked in multiple layers, the movement path of moisture or oxygen becomes longer than that of a single layer, so that penetration of moisture/oxygen affecting the light emitting element layer 14 may be effectively blocked.

The polarizing plate 18 may be adhered to the encapsulation layer. The polarizing plate 18 improves outdoor visibility of the display device. The polarizing plate 18 reduces light reflected from the surface of the display panel 100 and blocks light reflected from the metal of the circuit layer 12, thereby improving the brightness of the pixels. The polarizing plate 18 may be implemented as a polarizing plate or circular polarizing plate in which a linear polarizing plate and a phase retardation film are bonded.

A touch sensor layer may be formed and disposed on the encapsulation layer. The touch sensor layer may include capacitive touch sensors that sense a touch input based on a change in capacitance before and after the touch input. The touch sensor layer may include metal wiring patterns and insulating films forming the capacitance of the touch sensors. A capacitance of the touch sensor may be formed between the metal wiring patterns. The polarizing plate 18 may be disposed on the encapsulation layer to cover the metal pattern of the touch sensor layer. The polarizing plate may improve visibility and contrast ratio by converting the polarization of external light reflected by metals of the touch sensor layer and the circuit layer 12. The polarizing plate may be implemented as a circular polarizing plate or a polarizing plate in which a linear polarizing plate and a phase retardation film are bonded. A cover glass 20 may be adhered onto the polarizing plate.

The display panel 100 may further include a color filter layer disposed on the encapsulation layer. The color filter layer may include red, green, and blue color filters and a black matrix pattern. The color filter layer absorbs a portion of the wavelength of light reflected from the circuit layer 12 and the touch sensor layer, so that it can replace the role of the polarizing plate and may enhance the color purity. A color filter layer having a high light transmittance may be applied to the display panel without the polarizing plate to improve the light transmittance of the display panel 100 and to improve the thickness and flexibility of the display panel 100. In this case, the cover glass 20 may be bonded to the color filter layer.

Figure 3:
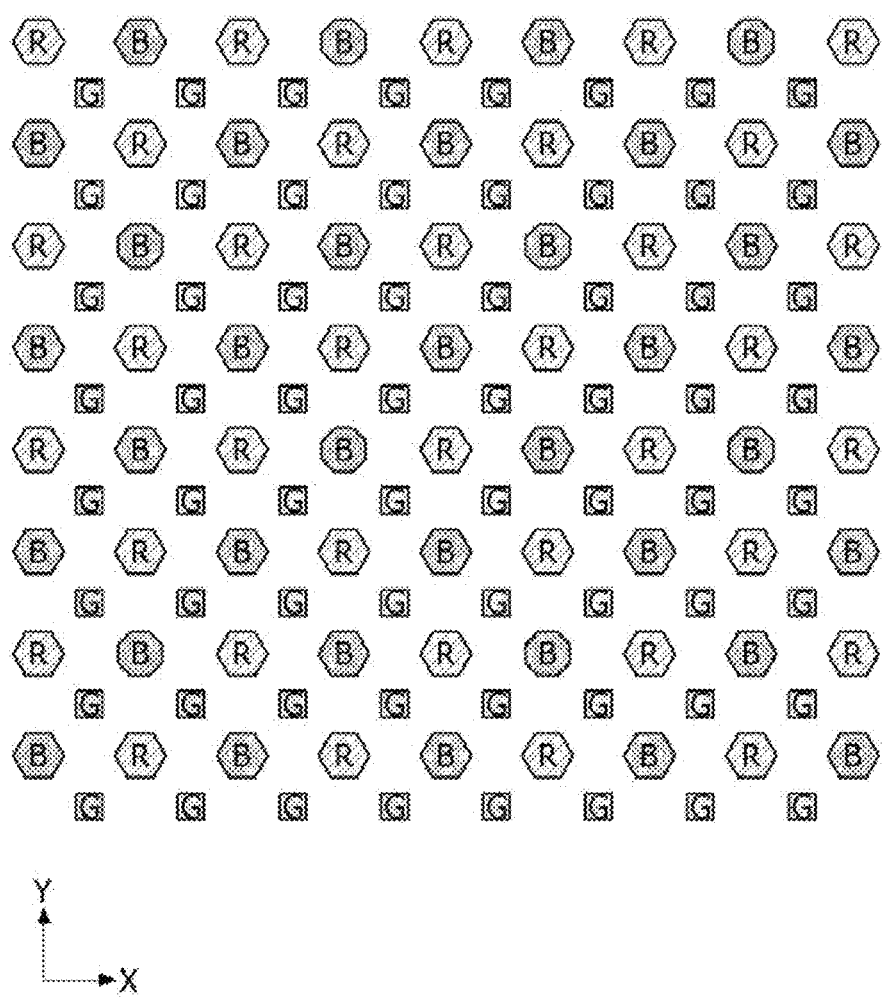
FIG. 3 is a plan view illustrating a pixel arrangement of a first pixel area according to one embodiment of the present disclosure.
Figure 4:
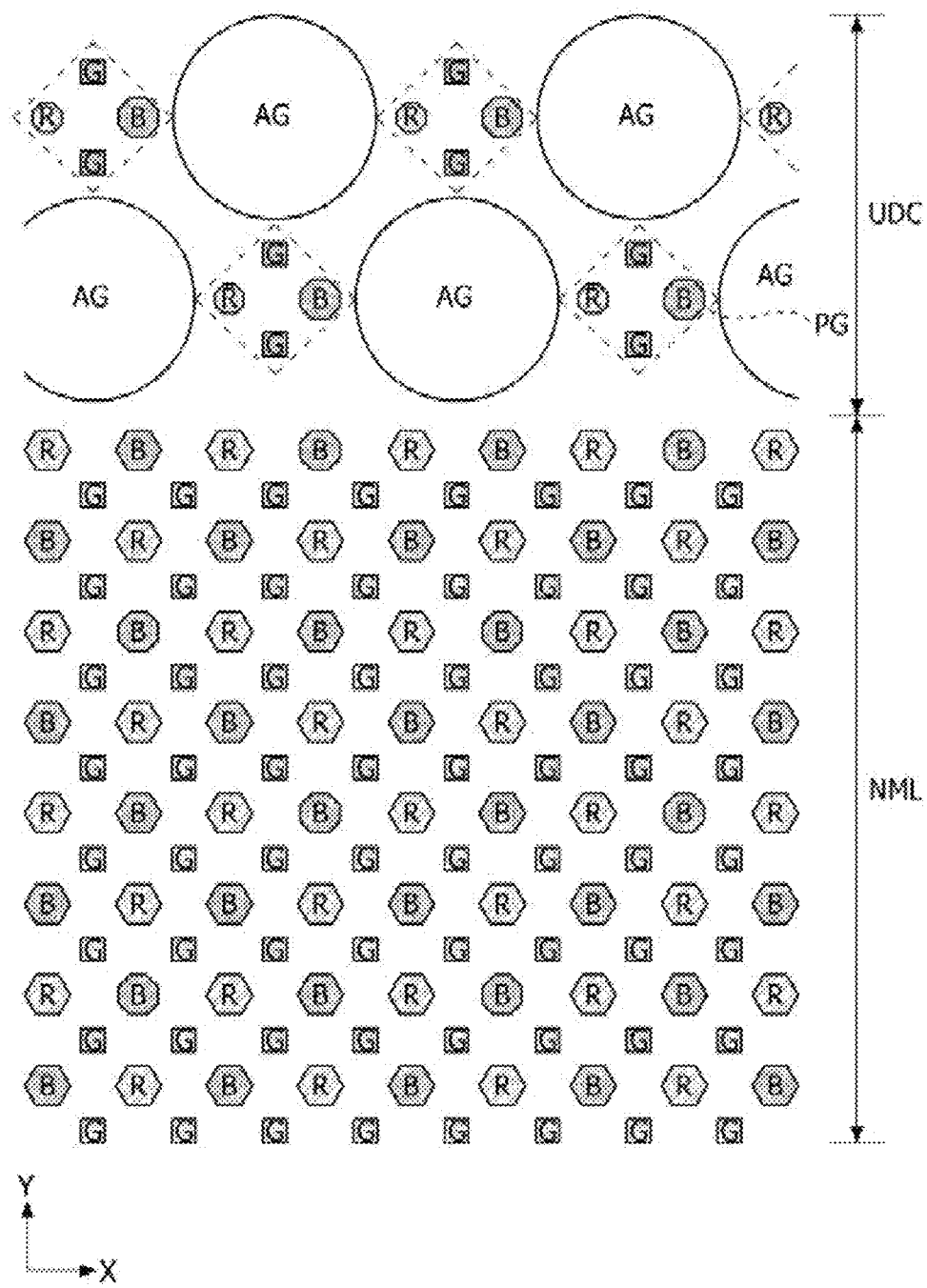
FIG. 4 is a plan view illustrating the pixel arrangement of a second pixel area and a boundary pixel area according to one embodiment of the present disclosure.

FIG. 3 is a plan view illustrating a pixel arrangement of the first pixel area. FIG. 4 is a plan view illustrating a pixel arrangement of the second pixel area.

Referring to FIGS. 3 and 4, sub-pixels R, G, and B are disposed in each of the first and second pixel areas NML and UDC. The second area UDC includes pixel groups PG spaced apart by a predetermined distance, and light transmitting portions AG disposed between neighboring pixel groups PG.

A pixel group PG of the second pixel area UDC may include one or two pixels, and may include two to four sub-pixels. A first pixel of the pixel group PG may comprise a red and first green sub-pixel R, G and a second pixel thereof may comprise a blue and second green sub-pixel R, G, but is not limited thereto.

In the second pixel area UDC, the light transmitting portions AG are pixel-free regions. The light transmitting portions AG may be made of transparent insulating materials without including metal lines or pixels. For example, no cathode electrodes may be disposed in the light transmitting portions AG. Due to the light transmitting portions AG, the PPI of the second pixel area UDC is low. The shape of the light transmitting portions AG is illustrated to be circular in FIG. 4, but is not limited thereto. For example, the light transmitting portions AG may be designed in various shapes such as a circle, an ellipse, and a polygon.

Due to the difference in PPI between the first pixel area NML and the second pixel area UDC, applying the same data voltage or current to the sub-pixels may result in lower luminance in the second pixel area UDC and a visible boundary between the first pixel area NML and the second pixel area UDC.

Figure 5:
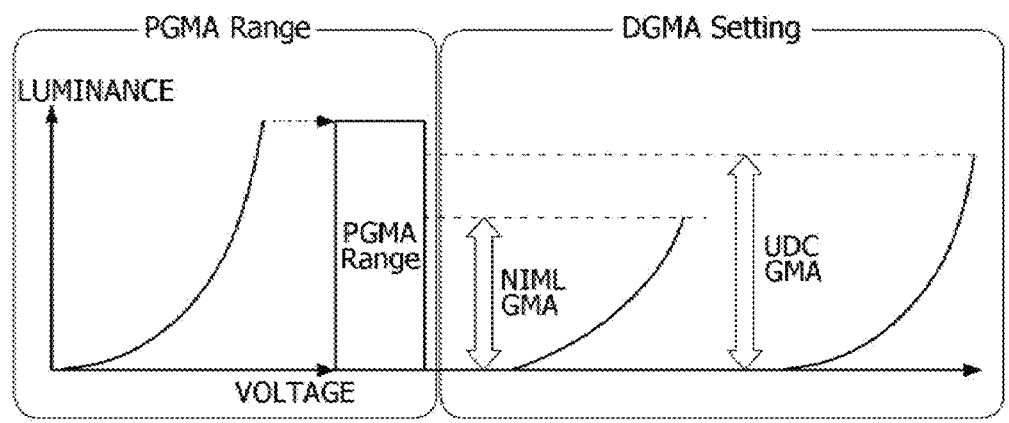
FIG. 5 is a diagram illustrating a gamma reference voltage range and digital gamma settings between pixel areas according to one embodiment of the present disclosure.

To compensate for the difference in luminance between the pixel areas NML and UDC, a heterogeneous gamma technology may be applied. For example, as shown in FIG. 5, a programmable gamma IC (P-GMA IC) may generate gamma reference voltages at an analog gamma reference voltage range (PGMA Range) that can obtain a luminance above the maximum luminance of the second pixel area UDC. The digital gamma compensation circuitry modulates pixel data using digital gamma data (DGMA settings) stored in a look-up table (LUT). The digital gamma data includes initial gamma compensation data divided by color and gray scale within the luminance range of the first pixel area NML.

The initial gamma compensation data is the gamma compensation data set when the luminance of the first and second pixel areas NML and UDC are within the allowable value or substantially the same immediately after the product of the display panel is shipped from the factory. The digital gamma data includes the initial gamma compensation data divided by color and gray scale within the luminance range of the first pixel area UDC.

The maximum data voltage, data voltage range (or dynamic range), maximum luminance, and luminance range of the second pixel area UDC are greater than those of the first pixel area UDC. The compensation value of the digital gamma data may be derived from the luminance difference between the first and second pixel areas NML and UDC measured in a deterioration sensing mode. In the case of a foldable display, the pixel deterioration compensation circuit may be operated by entering the deterioration sensing mode when the display panel 100 is folded.

The digital gamma data stored in the lookup table of the digital gamma compensation circuit may be updated by the gamma compensation value derived in the deterioration sensing mode. In FIG. 5, "NML GMA" is a gamma compensation curve for the first pixel area NML. "UDC GMA" is a gamma compensation curve for the second pixel area UDC.

Due to device characteristic deviations and process deviations caused in the manufacturing process of the display panel 100, there may be differences in electrical characteristics of the driving element among pixels, and such differences may increase as driving time of the pixels elapses. In order to compensate for a luminance between the first pixel area NML and the second pixel area UDC, an internal compensation technique or an external compensation technique may be applied to the display device.

The internal compensation technique sense a threshold voltage of the driving element for each sub-pixel by using an internal compensation circuit implemented in each pixel circuit and compensates the gate-source voltage Vgs of the driving element by the threshold voltage. The external compensation technique senses in real time a current or voltage of the driving element that varies according to electrical characteristics of the driving element by using an external compensation circuit. The external compensation technique compensates for the deviation (or variation) of the electrical characteristics of the driving element in each pixel in real time by modulating the pixel data (digital data) of the input image by the electrical characteristic deviation (or variation) of the driving element sensed for each pixel.

Figure 6:
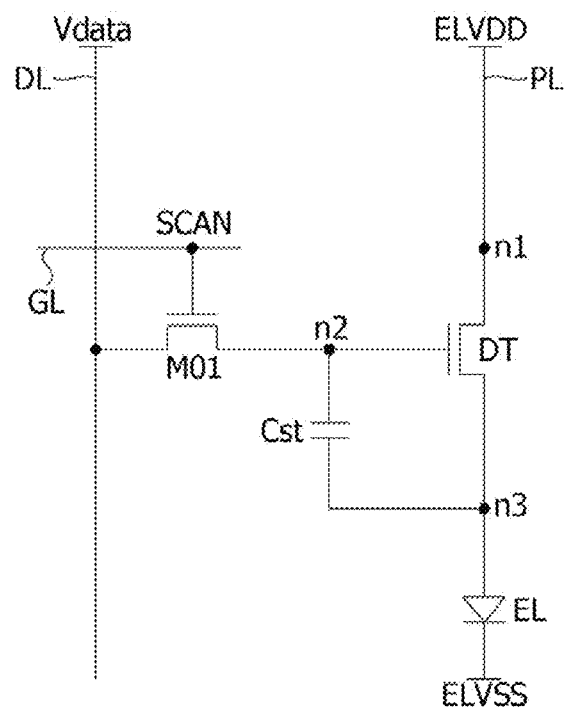
FIGS. 6 to 8 are circuit diagrams illustrating various pixel circuits applicable to a display device of the present disclosure.
Figure 7:
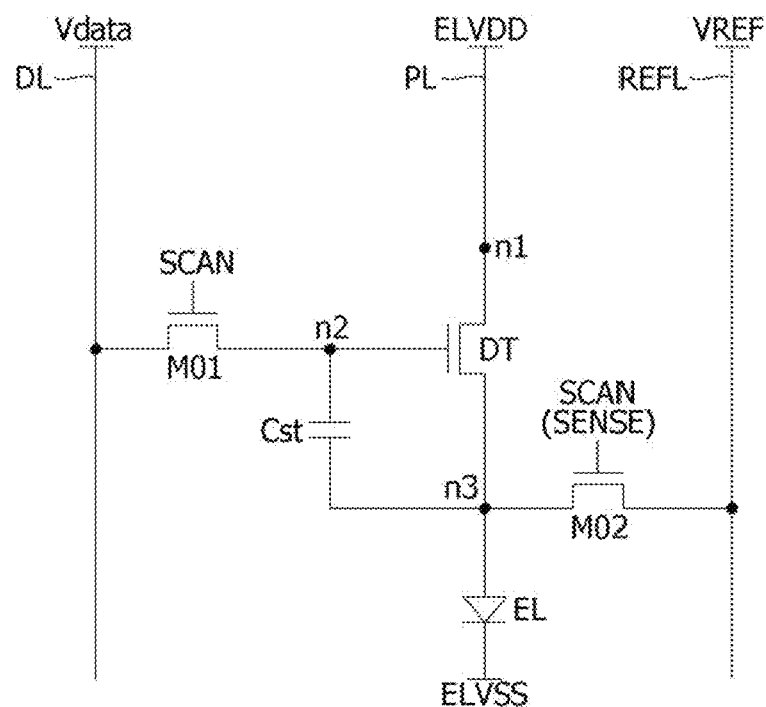
Figure 8:
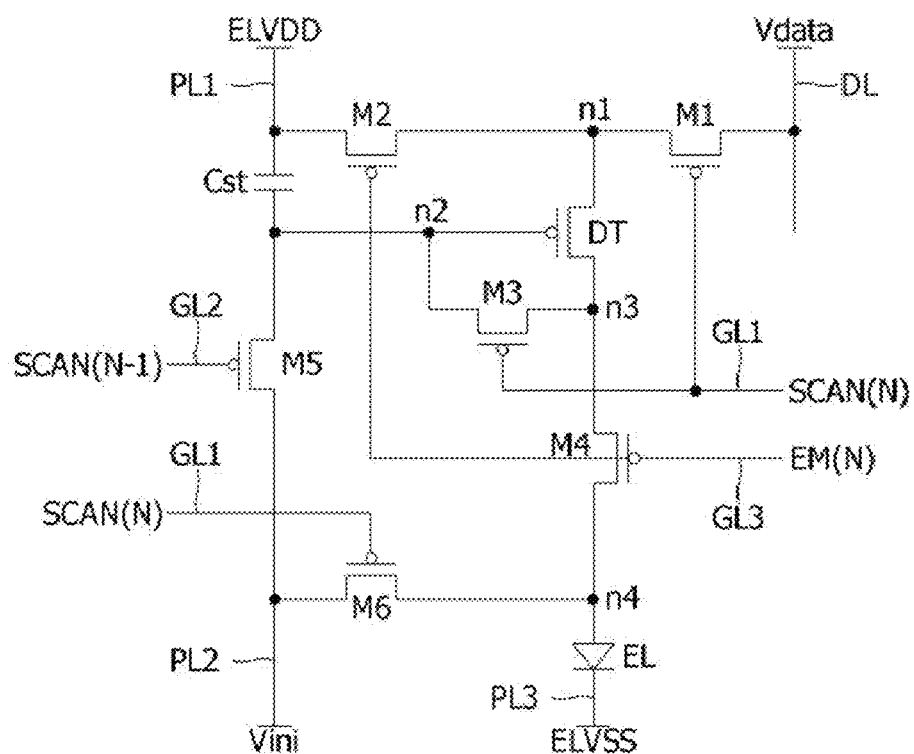
Figure 9:
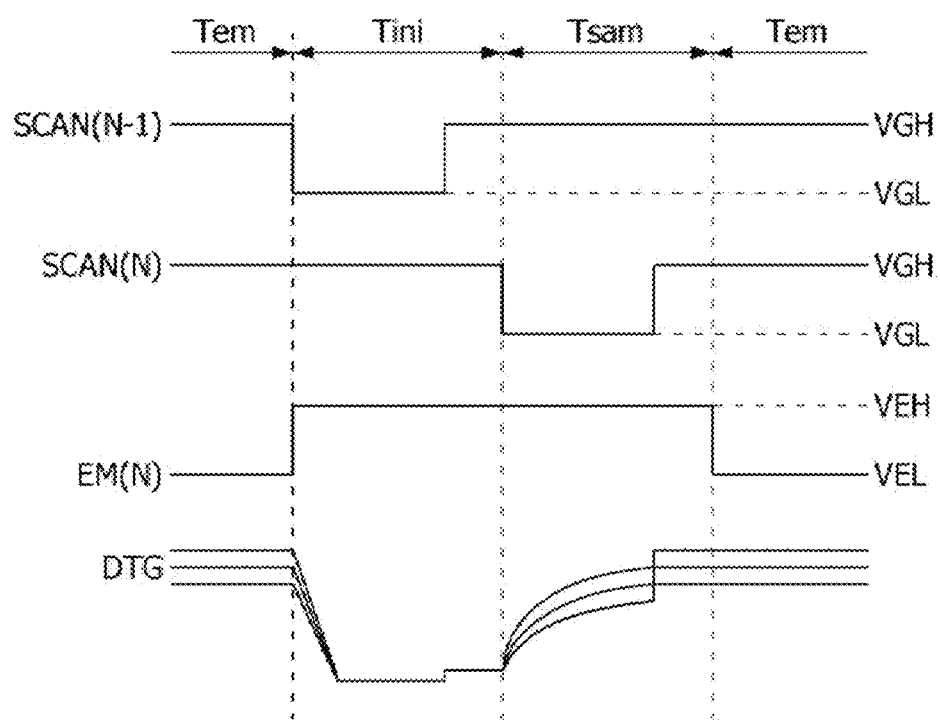
FIG. 9 is a waveform diagram illustrating a method of driving the pixel circuit shown in FIG. 8.

FIGS. 6 to 8 are circuit diagrams illustrating various pixel circuits applicable to the display device of the present disclosure. FIG. 9 is a waveform diagram illustrating a method of driving the pixel circuit shown in FIG. 8.

Referring to FIG. 6, the pixel circuit includes a light emitting element EL, a driving element DT configured to supply a current to the light emitting element EL, a switch element M01 configured to connect a data line DL to a second node n2 in response to a scan pulse SCAN, and a capacitor Cst connected between the second node n2 and a third node n3. The driving element DT and the switch element M01 can be implemented as n-channel transistors.

The driving element DT includes a gate electrode connected to the second node n2, a first electrode connected to a first node n1, and a second electrode connected to the third node n3. A VDD line PL to which a pixel driving voltage ELVDD is applied is connected to the first node n1. The light emitting element EL includes an anode connected to the third node n3 and a cathode connected to a VSS line to which a low potential power voltage ELVSS is applied.

The driving element DT drives the light emitting element EL by supplying a current to the light emitting element EL according to the gate-source voltage Vgs. The light emitting element EL is turned on and emits light when a forward voltage between the anode and the cathode is equal to or greater than a threshold voltage. The capacitor Cst is connected between the gate electrode and a source electrode of the driving element DT to maintain the gate-source voltage Vgs of the driving element DT.

Referring to FIG. 7, the pixel circuit further includes a second switch element M02 connected between a reference voltage line REFL and the second electrode of the driving element DT. In this pixel circuit, the driving element DT and the switch elements M01 and M02 may be implemented as n-channel transistors.

The second switch element M02 applies to a third node n3 a reference voltage VREF in response to the scan pulse SCAN or a separate sensing pulse SENSE. The reference voltage VREF is applied to the pixel circuit through the reference voltage line REFL.

A current flowing through a channel of the driving element DT or a voltage between the driving element DT and the light emitting element EL may be sensed through the reference line REFL. A current flowing through the reference line REFL is converted into a voltage through an integrator and then converted into real-time sensing data in the form of digital data through an analog-to-digital converter (ADC). The real-time sensing data includes a threshold voltage or mobility information of the driving element DT. The sensing data is transmitted to a data operation part. The data operation part receives the real-time sensing data from the ADC and adds or multiplies the lookup table data or compensation value selected based on the real-time sensing data to the pixel data to compensate for driving deviations and deterioration of the pixels.

Referring to FIGS. 8 and 9, the pixel circuit includes a light emitting element EL, a driving element DT for supplying a current to the light emitting element EL, and a switch circuit for switching voltages applied to the light emitting element EL and the driving element DT. The switch circuit includes an internal compensation circuit.

The switch circuit is connected to power lines PL1, PL2, and PL3 to which a pixel driving voltage ELVDD, a pixel reference voltage ELVSS, and an initialization voltage Vini are applied, a data line DL, and gate lines GL1, GL2, and GL3, and is configured to switch the voltages applied to the light emitting element EL and the driving element DT in response to a gate signal. The gate signal may include a scan pulse [SCAN(N-1), SCAN(N)] and an emission control pulse (hereinafter referred to as "EM pulse") [EM(N)]. Here, N is a positive integer.

The switch circuit includes an internal compensation circuit that samples a threshold voltage Vth of the driving element DT using a plurality of switch elements M1 to M6 and stores the voltages in a capacitor Cst, and compensates for the gate voltage of the driving element DT by the threshold voltage Vth of the driving element DT. Each of the driving element DT and the switch elements M1 to M6 can be implemented as a p-channel TFT.

A driving period of the pixel circuit can be divided into an initialization period Tini, a sampling period Tsam, and an emission period Tem, as shown in FIG. 9.

An Nth scan pulse SCAN(N) is generated as a gate-on voltage VGL in the sampling period Tsam and applied to a first gate line GL1. An (N-1)th scan pulse SCAN(N-1) is generated as the gate-on voltage VGL in the initialization period Tini prior to the sampling period and applied to a second gate line GL2. The EM pulse EM(N) is generated as a gate-off voltage VGH in the initialization period Tini and the sampling period Tsam and applied to a third gate line GL3.

During the initialization period Tini, the (N-1)th scan pulse SCAN(N-1) is generated as the gate-on voltage VGL, and each voltage of the Nth scan pulse SCAN(N) and the EM pulse EM(N) is the gate-off voltage VGH. During the sampling period Tsam, the Nth scan pulse SCAN(N) is generated as a pulse of the gate-on voltage VGL, and each voltage of the (N-1)th scan pulse SCAN(N-1) and the EM pulse EM(N) is the gate-off voltage VGH. The EM pulse EM(N) is generated as the gate-on voltage VGL during at least a part of the light emission period Tem, and each voltage of the (N-1)th scan pulse SCAN(N-1) and the Nth scan pulse SCAN (N) is generated as the gate-off voltage VGH.

During the initialization period Tini, the fifth switch element M5 is turned on according to the gate-on voltage VGL of the (N-1)th scan pulse SCAN(N-1) to initialize the pixel circuit. During the sampling period Tsam, the first and second switch elements M1 and M2 are turned on according to the gate-on voltage VGL of the Nth scan pulse SCAN(N) and a data voltage Vdata compensated for by the threshold voltage of the driving element DT is stored in the capacitor Cst. At the same time, the sixth switch element M6 is turned on during the sampling period Tsam, and lowers the voltage of the fourth node n4 to the reference voltage VREF to suppress light emission of the light emitting element EL.

When the light emission period Tem starts, the EM line GL3 is inverted to the gate-on voltage VGL. During the light emission period Tem, the scan lines GL1 and GL2 maintain the gate-off voltage VGH. During the light emission period Tem, since the third and fourth switch elements M3 and M4 are turned on, the light emitting element EL can emit light. During the light emission period Tem, in order to accurately express the luminance of low grayscale, a voltage level of the EM pulse EM(N) can be reversed at a predetermined duty ratio between the gate-on voltage VGL and the gate-off voltage VGH. In this case, the third and fourth switch elements M3 and M4 can repeatedly turn on/off according to the duty ratio of the EM pulse EM(N) during the light emission period Tem.

The anode of the light emitting element EL is connected to the fourth node n4 between the fourth and sixth switch elements M4 and M6. The fourth node n4 is connected to the anode of the light emitting element OLED, a second electrode of the fourth switch element M4, and a second electrode of the sixth switch element M6. The cathode of the light-emitting element EL is connected to the VSS line PL3 to which the low potential power supply voltage ELVSS is applied. The light emitting element EL emits light with a current Ids flowing according to a gate-source voltage Vgs of the driving element DT. A current path of the light emitting element EL is switched by the third and fourth switch elements M3 and M4.

The storage capacitor Cst is connected between the VDD line PL1 and the second node n2. The data voltage Vdata compensated by the threshold voltage Vth of the driving element DT is charged in the capacitor Cst. Since the data voltage Vdata in each of the sub-pixels is compensated by the threshold voltage Vth of the driving device DT, the characteristic deviation of the driving device DT in the sub-pixels is compensated.

The first switch element M1 is turned on in response to the gate-on voltage VGL of the Nth scan pulse SCAN(N) to connect the second node n2 to the third node n3. The second node n2 is connected to a gate electrode of the driving element DT, a first electrode of the capacitor Cst, and a first electrode of the first switch element M1. The third node n3 is connected to a second electrode of the driving element DT, a second electrode of the first switch element M1, and a first electrode of the fourth switch element M4. A gate electrode of the first switch element M1 is connected to the Nth scan line GL1 to receive the Nth scan pulse SCAN(N). The first electrode of the first switch element M1 is connected to the second node n2, and the second electrode of the first switch element M1 is connected to the third node n3.

Since the first switch element M1 is turned on during very short one horizontal period (1H) in which the Nth scan signal SCAN(N) is generated as the gate-on voltage VGL in one frame period, a leakage current may occur in an off state. In order to restrain the leakage current of the first switch element M1, the first switch element M1 can be implemented with a transistor having a dual gate structure in which two transistors are connected in series.

The second switch element M2 is turned on in response to the gate-on voltage VGL of the Nth scan pulse SCAN(N) to supply the data voltage Vdata to the first node n1. A gate electrode of the second switch element M2 is connected to the Nth scan line GL1 to receive the Nth scan pulse SCAN(N). A first electrode of the second switch element M2 is connected to the first node n1. The second electrode of the second switch element M2 is connected to the data lines DL of the first region DA to which the data voltage Vdata is applied. The first node n1 is connected to the first electrode of the second switch element M2, a second electrode of the third switch element M3, and a first electrode of the driving element DT The third switch element M3 is turned on in response to the gate-on voltage VGL of the EM pulse EM(N) to connect the VDD line PL1 to the first node n1. A gate electrode of the third switch element M3 is connected to the EM line GL3 to receive the EM pulse EM(N). A first electrode of the third switch element M3 is connected to the VDD line PL1. The second electrode of the third switch element M3 is connected to the first node n1.

The fourth switch element M4 is turned on in response to the gate-on voltage VGL of the EM pulse EM(N) to connect the third node n3 to the anode of the light emitting element OLED. A gate electrode of the fourth switch element M4 is connected to the EM line GL3 to receive the EM pulse EM(N). The first electrode of the fourth switch element M4 is connected to the third node n3, and the second electrode is connected to the fourth node n4.

The fifth switch element M5 is turned on in response to the gate-on voltage VGL of the N-lth scan pulse SCAN(N-1) to connect the second node n2 to the Vini line PL2. A gate electrode of the fifth switch element M5 is connected to the N-lth scan line GL2 to receive the N-lth scan pulse SCAN (N-1). A first electrode of the fifth switch element M5 is connected to the second node n2, and a second electrode is connected to the Vini line PL2. In order to restrain the leakage current of the fifth switch element M5, the fifth switch element M5 is implemented with a transistor having a dual gate structure in which two transistors are connected in series.

The sixth switch element M6 is turned on in response to the gate-on voltage VGL of the Nth scan pulse SCAN(N) to connect the Vini line PL2 to the fourth node n4. A gate electrode of the sixth switch element M6 is connected to the Nth scan line GL1 to receive the Nth scan pulse SCAN(N). A first electrode of the sixth switch element M6 is connected to the Vini line PL2, and a second electrode of the sixth switch element M6 is connected to the fourth node n4.

In another embodiment, the gate electrodes of the fifth and sixth switch elements M5 and M6 can be commonly connected to the N-lth scan line GL2 to which the N-lth scan pulse SCAN(N-1) is applied. In this case, the fifth and sixth switch elements M5 and M6 can be simultaneously turned on in response to the N-lth scan pulse SCAN(N-1).

The driving element DT drives the light emitting element EL by controlling the current flowing through the light emitting element EL according to the gate-source voltage Vgs. The driving element DT includes the gate connected to the second node n2, the first electrode connected to the first node n1, and the second electrode connected to the third node n3. In FIG. 9, "DTG" is the gate voltage of the driving element DT, that is, the voltage of the second node n2.

It should be noted that the configuration of the pixel circuit present in the display devices of the present disclosure is not limited to the examples of FIGS. 6 to 8. For example, the data voltage Vdata can be applied to the gate electrode of the driving element DT or applied to the first electrode or the second electrode of the driving element DT. The gamma characteristic curve of the data voltage Vdata can be set as a positive gamma curve or an inverse gamma curve according to the channel characteristic of the driving element DT or an electrode to which the data voltage Vdata is applied. The data voltage Vdata can be applied to the first electrode or the second electrode of the n-channel driving element DT or the data voltage Vdata can be applied to the gate electrode of the p-channel driving element DT. The data voltage Vdata applied to the gate electrode of the n-channel driving element DT is a voltage determined by the positive gamma curve. The data voltage Vdata applied to the first electrode or the second electrode of the n-channel driving element DT is a voltage determined by the inverse gamma curve. The data voltage Vdata applied to the gate electrode of the p-channel driving element DT is a voltage determined by the inverse gamma curve. The data voltage Vdata applied to the first electrode or the second electrode of the p-channel driving element DT is a voltage determined by the positive gamma curve.

Figure 10:
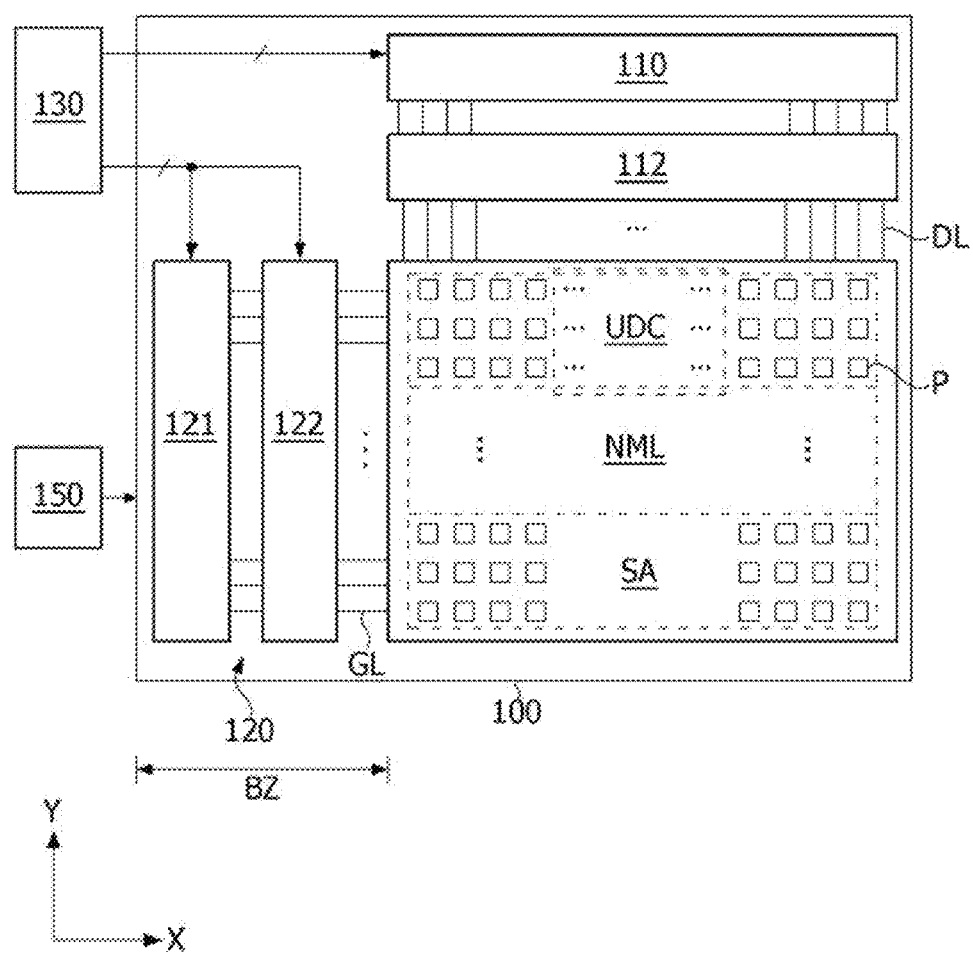
FIG. 10 is a block diagram illustrating a display device according to an embodiment of the present disclosure.
Figure 11:
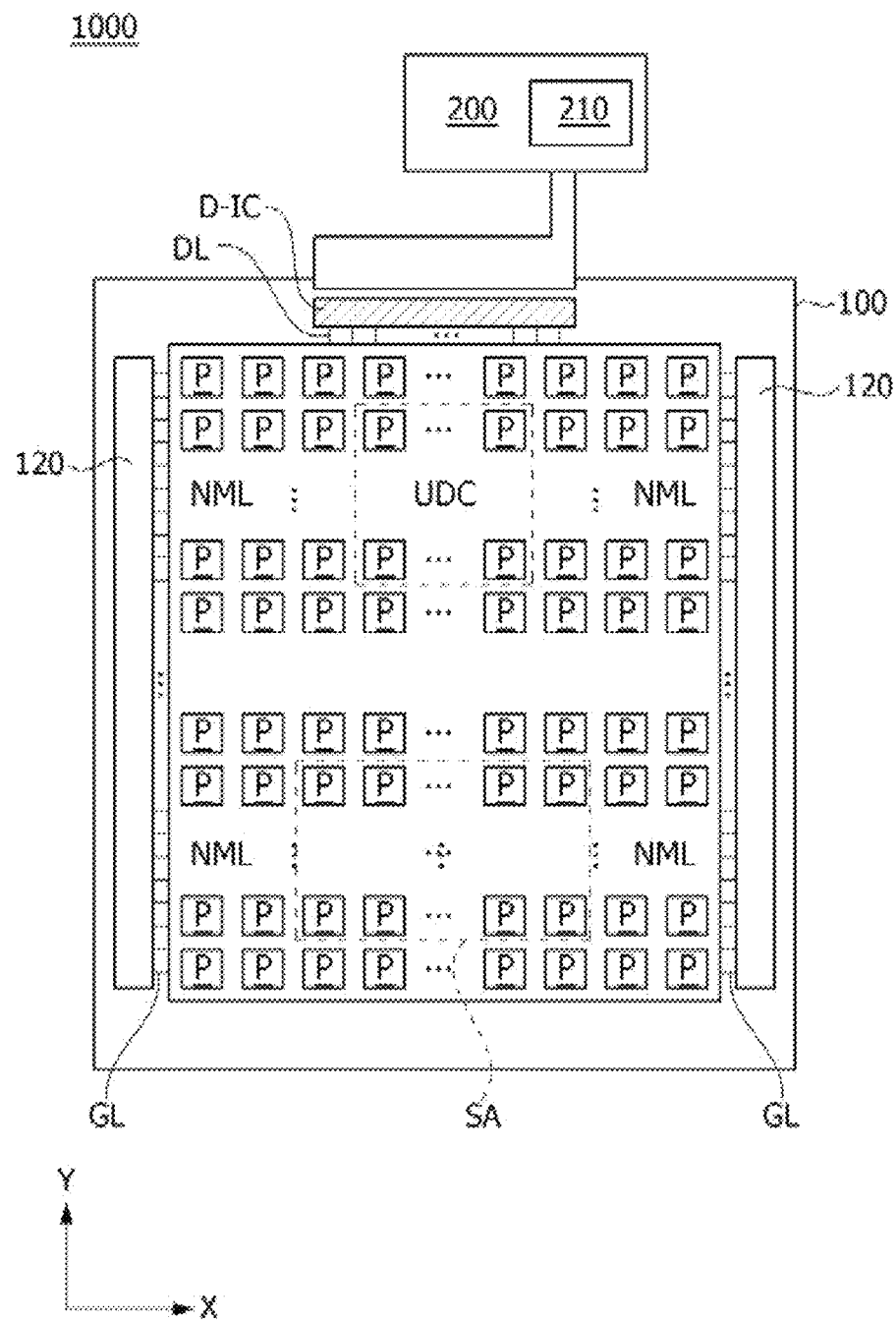
FIG. 11 is a diagram illustrating an example in which a display device according to an embodiment of the present disclosure is applied to a mobile terminal.

FIG. 10 is a block diagram illustrating the display device according to an embodiment of the present disclosure. FIG. 11 is a diagram illustrating an example in which the display device according to an embodiment of the present disclosure is applied to a mobile terminal.

Referring to FIGS. 10 and 11, the display device according to an embodiment of the present disclosure includes a display panel 100, display panel drivers 110 and 120 for writing pixel data of an input image into pixels P of the display panel 100, a timing controller 130 for controlling the display panel drivers, and a power supply 150 for generating power required for driving the display panel 100.

The display panel 100 includes a pixel array that displays an input image on a display area of the screen. The pixel array includes the first pixel area NML and the second pixel area UDC as described above. The pixel array further includes a third pixel area overlapping the sensing area SA. Each of the sub-pixels of the pixel array may drive the light emitting element EL using the pixel circuit as shown in FIGS. 6 to 8.

In a display mode, pixel data of the input image may be written to the pixels of the third pixel area overlapping the first pixel area NML, the second pixel area UDC, and the sensing area SA so that the input image may be displayed on the display area of the display panel 100. Thus, the pixels of the third pixel area display the input image together with the first and second pixel areas NML and UDC in the display mode.

At least some of the pixels in the third pixel area may emit light to the user's fingerprint in a fingerprint sensing mode to serve as a light source. The pixels in the third pixel area are not emitted in the deterioration sensing mode.

Touch sensors may be disposed on the screen of the display panel 100. The touch sensors may be disposed as an on-cell type or an add-on type on the screen of the display panel or implemented as in-cell type touch sensors embedded in the pixel array.

The display panel driver reproduces the input image on the screen of the display panel 100 by writing the pixel data of the input image to the sub-pixels. The display panel driver includes the data driver 110 and the gate driver 120. The display panel driver may further include a demultiplexer 112 disposed between the data driver 110 and the data lines DL. The demultiplexer 112 may be omitted.

The display panel driver may operate in a low-speed driving mode under the control of the timing controller 130. In the low speed driving mode, the input image may be analyzed to reduce the power consumption of the display device when the input image does not change by a predetermined amount of time. In the low speed driving mode, a refresh rate of the pixels P is lowered to control the data writing period of the pixels P to be longer when a still image is inputted for a certain period of time or more, thereby reducing the power consumption. The low-speed driving mode is not limited to a case where the still image is inputted. For example, when the display device operates in a standby mode or when a user command or an input image is not inputted to the display panel driver for a predetermined period of time or more, the display panel driver may operate in the low-speed driving mode.

The data driver 110 generates a data voltage Vdata by converting the pixel data of the input image, which is digital data, using a digital-to-analog converter (hereinafter referred to as "DAC"). The DAC receives the pixel data, which is digital data, and is supplied a gamma reference voltage from a gamma voltage generator of the power supply 150. The data driver 110 generates a gamma compensation voltage corresponding to each gray scale of the pixel data by dividing the gamma reference voltage using the voltage dividing circuit. The DAC of the data driver 110 is disposed on each of the channels of the data driver 110. The DAC converts the pixel data into the gamma compensation voltage using an array of switch elements that select a voltage in response to bits of the pixel data, and outputs the data voltage Vdata. The data voltage Vdata outputted from each of the channels of the data driver 110 may be supplied to the data lines DL of the display panel 100, or may be supplied to the data lines DL through the demultiplexer 112. The ADC of the external compensation circuitry may be integrated along with the data drive 110 in one drive IC.

The demultiplexer 112 time-divides and distributes the data voltage Vdata output through the channels of the data driver 110 to the plurality of data lines DL. The number of channels of the data driver 110 can be reduced due to the demultiplexer 112. The demultiplexer 112 can be omitted. In this case, the channels of the data driver 110 are directly connected to the data lines DL.

The gate driver 120 can be implemented as a gate in panel (GIP) circuit that is directly formed on a bezel region BZ of the display panel 100 together with a TFT array of the pixel array. The gate driver 120 outputs gate signals to gate lines GL under the control of the timing controller 130. The gate driver 120 can sequentially supply the gate signals to the gate lines GL by shifting the gate signals using a shift register. The voltage of the gate signal swings between the gate-off voltage VGH and the gate-on voltage VGL. The gate signal can include the scan pulse, the EM pulse, the sensing pulse, etc., shown in FIGS. 6 to 8.

The gate driver 120 can be disposed on each of the left and right bezels (or two opposite sides) of the display panel 100 to supply the gate signal to the gate lines GL in a double feeding method. In the double feeding method, the gate drivers 120 on both sides are synchronized so that the gate signals can be simultaneously applied from both ends of one gate line. In another exemplary embodiment, the gate driver 120 can be disposed on any one of the left and right bezels (or two opposite sides) of the display panel 100 and can supply the gate signals to the gate lines GL in a single feeding method.

The gate driver 120 can include a first gate driver 121 and a second gate driver 122. The first gate driver 121 outputs the scan pulse and the sensing pulse, and shifts the scan pulse and the sensing pulse according to the shift clock. The second gate driver 122 outputs a pulse of the EM signal and shifts the EM pulse according to the shift clock. In the case of the bezel-free model, at least some of the switch elements composing the first and second gate drivers 121 and 122 can be dispersedly disposed in the pixel array.

The timing controller 130 receives pixel data of an input image and a timing signal synchronized with the pixel data from the host system. The timing signal includes a vertical synchronization signal Vsync, a horizontal synchronization signal Hsync, a clock CLK, a data enable signal DE, etc. One period of the vertical synchronization signal Vsync is one frame period. One period of each of the horizontal synchronization signal Hsync and the data enable signal DE is one horizontal period 1H. The pulse of the data enable signal DE is synchronized with one-line data to be written to the pixels P of one pixel line. Since the frame period and the horizontal period can be known by counting the data enable signal DE, the vertical synchronization signal Vsync and the horizontal synchronization signal Hsync may be omitted.

The timing controller 130 transmits the pixel data of the input image to the data driver 110, and synchronizes the data driver 110, the demultiplexer 112, and the gate driver 120. The timing controller 130 can include a data operator that receives sensing data obtained from the pixels P in the display panel driver to which the external compensation technology is applied and modulates the pixel data. In this case, the timing controller 130 can transmit the pixel data modulated by the data operator to the data driver 110.

The timing controller 130 can control the operation timing of the display panel drivers 110, 112, and 120 at a frame frequency of an input frame frequency×i Hz (i is a positive integer greater than 0) by multiplying the input frame frequency by i times. The input frame frequency is 60 Hz in the National Television Standards Committee (NTSC) scheme and 50 Hz in the Phase-Alternating Line (PAL) scheme. The timing controller 130 can lower the frame frequency to a frequency between 1 Hz and 30 Hz to lower the refresh rate of the pixels P in the low-speed driving mode.

The timing controller 130 generates a data timing control signal for controlling the operation timing of the data driver 110, a switch control signal for controlling the operation timing of the demultiplexer 112, and a gate timing control signal for controlling the operation timing of the gate driver 120 based on the timing signals Vsync, Hsync, and DE received from the host system.

Voltage levels of the gate timing control signals outputted from the timing controller 130 may be converted into a gate high voltage VGH/VEH and a gate low voltage VGL/VEL via a level shifter (not shown), which are then supplied to the gate driver 120. The level shifter receives the clock of the gate timing control signal from the timing controller 130 and outputs the timing signals required to drive the gate driver 120, such as a start pulse and a shift clock. A low level voltage of the gate timing control signal inputted to the level shifter may be converted into a gate low voltage VGL via the level shifter, and a high level voltage of the gate timing control signal may be converted into a gate high voltage VGH/VEH.

The power supply 150 may include a charge pump, a regulator, a buck converter, a boost converter, a gamma voltage generator circuit 150, and the like. The power supply 150 generates power required for driving the display panel driver and the display panel 100 by adjusting a DC input voltage from the host system. The power supply 150 may output constant voltages (or DC voltages) such as the gamma reference voltage, gate high voltage VGH/VEH, gate low voltage VGL/VEL, pixel driving voltage ELVDD, pixel reference voltage ELVSS, initialization voltage Vini, reference voltage VREF, and the like.

The gamma voltage generator circuit may be implemented as a programmable gamma IC. The programmable gamma IC may vary the gamma reference voltage according to the register setting. The gamma reference voltage is supplied to the data driver 110. The gate high voltage VGH/VEH and the gate low voltage VGL/VEL are supplied to the level shifter and the gate driver 120. The pixel driving voltage ELVDD, the pixel reference voltage ELVSS, the initialization voltage Vini, and the reference voltage VREF are commonly supplied to the pixel circuits through the power lines. The pixel driving voltage ELVDD is set higher than the pixel reference voltage ELVSS, the initialization voltage Vini, and the reference voltage VREF.

The host system may be a main circuit board of a television (TV) system, a set-top box, a navigation system, a personal computer (PC), a vehicle system, a home theater system, a mobile terminal, or a wearable terminal. The host system may scale the pixel data of the input video from video sources to match the resolution of the display panel and transmit it to the timing controller 130. In the mobile terminal 1000, the timing controller 130, the data driver 110, and the power supply 150 may be integrated into one drive integrated circuit (drive IC, D-IC) as shown in FIG. 11. In FIG. 11, reference numeral "200" denotes the host system.

The host system 200 includes an authentication processor 210. The authentication processor 210 may process biometric authentication based on data received from the optical device(s). For example, the authentication processor 210 may include one or both of a face recognition processor and a fingerprint recognition processor. The face recognition processor processes user authentication by comparing face pattern data received from the second optical device, for example, an infrared camera, with predetermined feature points of the user's face pattern. The fingerprint recognition processor processes user authentication by comparing fingerprint pattern data received from the first optical device 40 with the predetermined fingerprint pattern of the user. Hereinafter, "first and second optical devices" will be abbreviated as "optical devices".

Either of the optical devices 30 and 40 may be driven by the host system 200 or the timing controller 130 when a user authentication event occurs. In the deterioration sensing mode, the pixels in the first and second pixel areas NML, UDC and the first optical device 40 may be driven by the timing controller 130 or the pixel deterioration compensation circuitry to be described later when the display panel is in a folded state (Unfold).

Figure 12A:
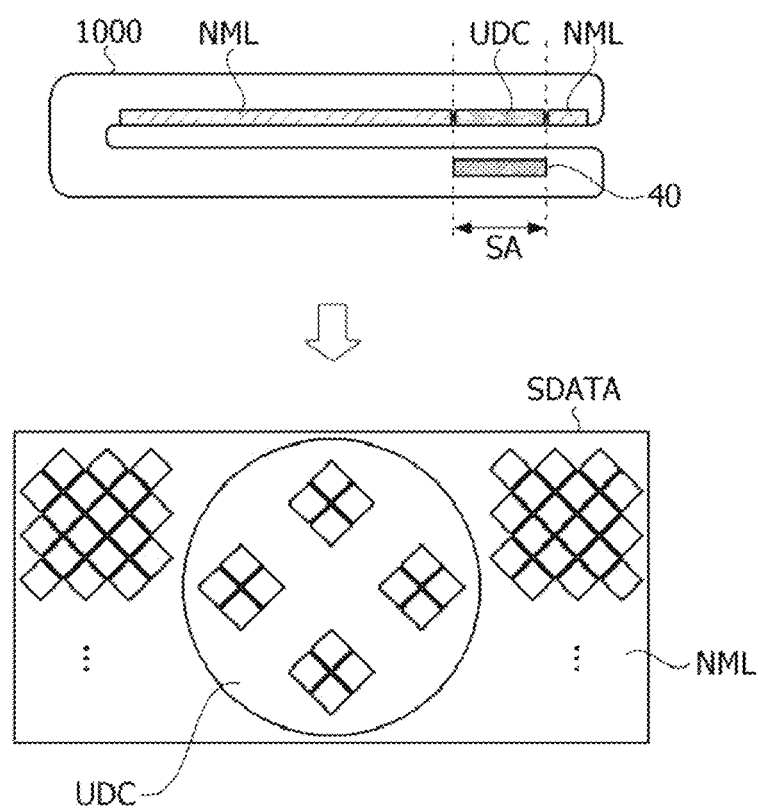
FIGS. 12A to 12C are diagrams illustrating pixels in a pixel area overlapping a sensing area when a display panel of a foldable display is folded, and sensing data obtained from the sensing area.
Figure 12B:
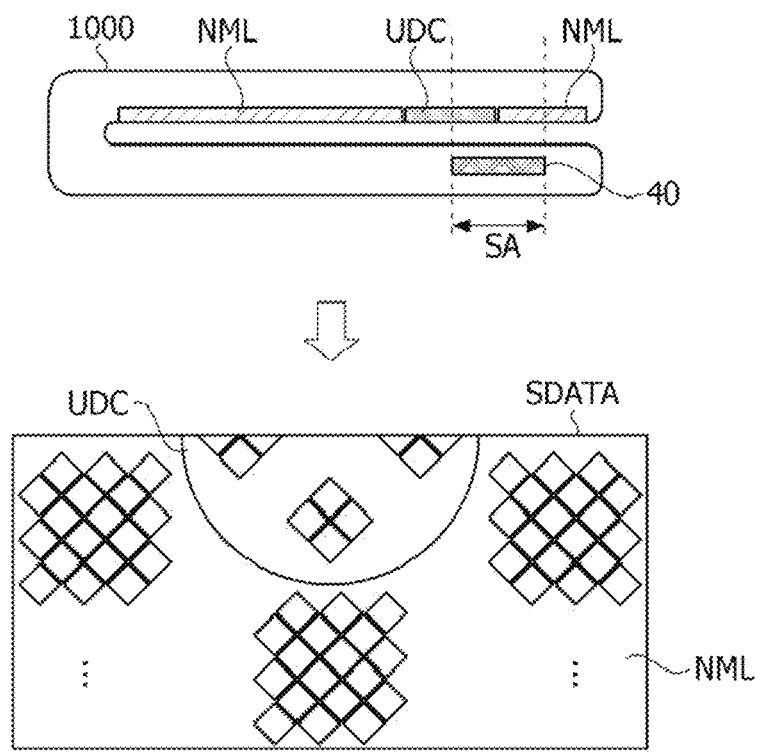
Figure 12C:
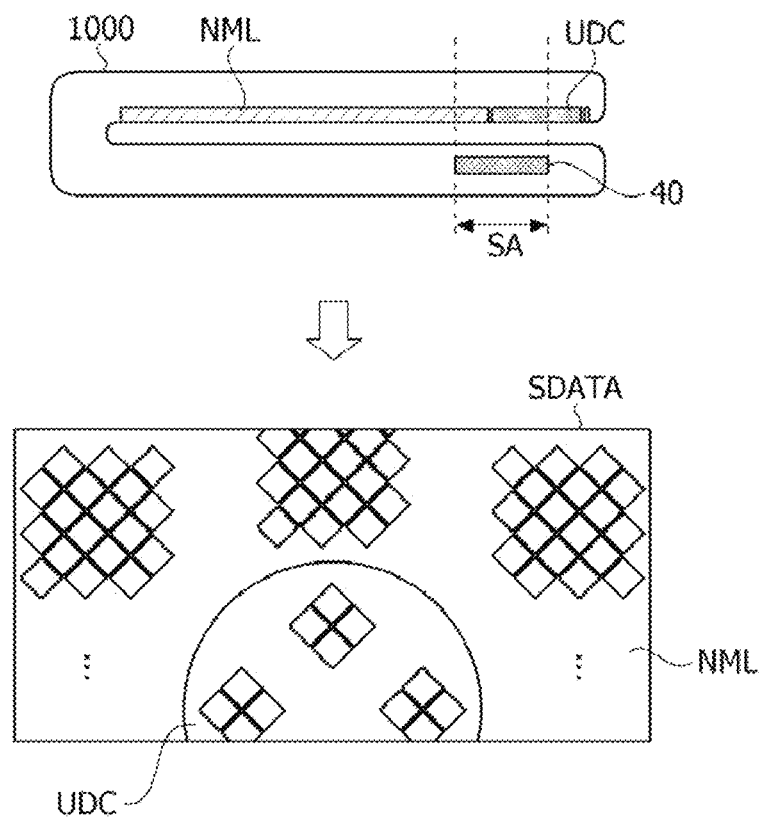

FIGS. 12A to 12C are diagrams illustrating pixels in a pixel area overlapping a sensing area when the display panel of a foldable display is folded, and sensing data obtained from the sensing area. In FIGS. 12A to 12C, the upper side drawing is a cross-sectional view illustrating a folded state of the foldable display, and the lower side drawing shows sensing data SDATA outputted from the first optical device or sensor pixels in the sensing area SA.

With the display panel of the foldable display folded, the second pixel area UDC is placed on the display panel 100 such that the first and second pixel areas NML and UDC overlap together in the sensing area SA.

As shown in FIG. 12A, all of the pixels in the second pixel area UDC and a portion of the first pixel area NML close to the second pixel area UDC may overlap in the sensing area SA. In this case, the sensing data SDATA outputted from the optical device 40 by light, which is generated from some pixels in the first pixel area NML and all pixels in the second pixel area UDC, on the receiving surface of the optical device 40 includes luminance values of some pixels in the first pixel area NML and luminance values of all pixels in the second pixel area UDC.

As shown in FIGS. 12B and 12C, a portion of the second pixel area UDC and a portion of the first pixel area NML close to the second pixel area UDC may overlap with the sensing area SA. In this case, the sensing data SDATA outputted from the optical device 40 by sensing light generated from some pixels in the first pixel area NML and some pixels in the second pixel area UDC, on the receiving surface of the optical device 40 includes luminance values of some pixels in the first pixel area NML and luminance values of some pixels in the second pixel area UDC.

Figure 13:
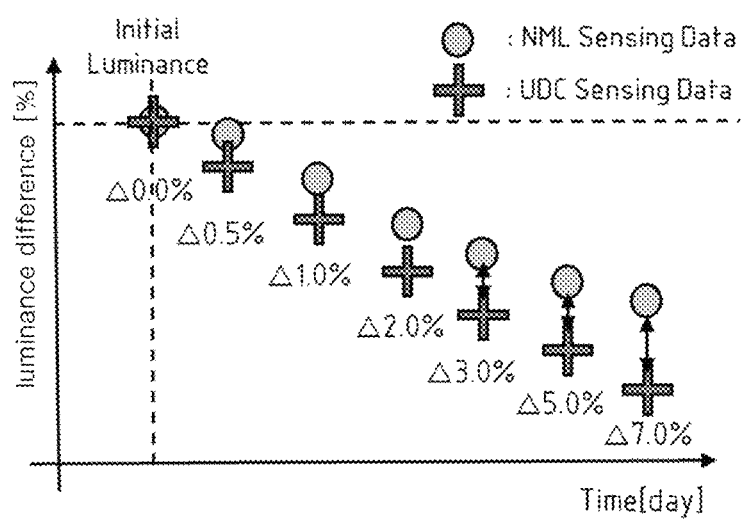
FIG. 13 is a diagram illustrating an example in which a luminance difference between a first pixel and a second pixel increases over time.

Due to the difference in PPI and data voltage, the difference in the deterioration degree between the pixels in the first pixel area NML and the second pixel area UDC may increase over time. As shown in FIG. 13, although the initial luminance of the first pixel area NML and the second pixel area UDC is the same, the luminance difference ΔL increases over time due to the difference in the amount of pixel deterioration between the pixel areas NML and UDC. The pixel luminance value of each of the first pixel area NML and the second pixel area UDC may be measured from the sensing data SDATA outputted from the optical device 40 in the deterioration sensing mode in which the display panel is folded. In FIG. 13, the abscissa is time [day] and the ordinate is the luminance difference [%] between the pixel areas NML and UDC outputted from the optical device 40.

The display device of the present disclosure performs the deterioration sensing mode when the display panel is folded. The deterioration sensing mode may be an unused period of time in which no image is displayed on the pixel array. In the deterioration sensing mode, a predetermined display pattern data is written to the pixels, and the pixels emit light regardless of the pixel data of the input image. In the foldable display, the pixels emit light in a folded, unused state in which the screen is hidden from view. By utilizing the pixel deterioration compensation circuit as shown in FIG. 14, the display device of the present disclosure may reduce the luminance difference ΔL between the pixel areas NML and UDC within a predetermined allowable value in the deterioration sensing mode.

Figure 14:
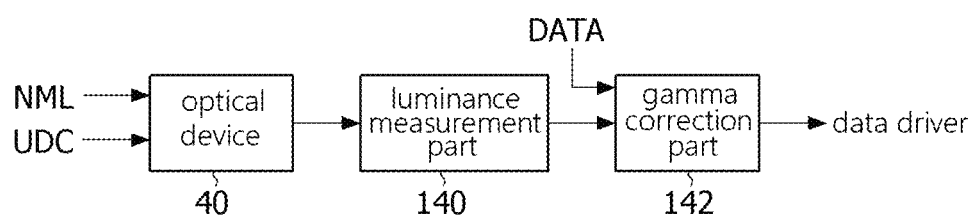
FIG. 14 is a circuit diagram illustrating a pixel deterioration compensation circuit according to one embodiment of the present disclosure.

FIG. 14 is a circuit diagram illustrating the pixel deterioration compensation circuit according to one embodiment of the present disclosure.

Referring to FIG. 14, the pixel deterioration compensation circuit includes the optical device 40, a luminance measurement part 140, and a gamma correction part 142. In the present disclosure, the pixel deterioration compensation circuit may also be referred to as a luminance difference compensation circuit.

In the deterioration sensing mode, the pixels in the first and second pixel areas NML and UDC are written with the display pattern data to drive the pixels, and the optical device 40 is driven. The timing controller 130 or drive IC (D-IC) shown in FIGS. 10 and 11 may include the luminance measurement part 140 and the gamma correction part 142.

The optical device 40 may be driven in the deterioration sensing mode. The optical device 40 photoelectrically converts light received from the pixels in the first and second pixel areas NML and UDC within the sensing area SA to provide luminance values of the first and second pixel areas NML and UDC to the luminance measurement part 140. The luminance measurement part 140 receives the luminance value of the first pixel area NML and the luminance value of the second pixel area UDC from the optical device 40 and measures (or calculates) the luminance difference ΔL between the first and second pixel areas NML and UDC and provides it to the gamma correction part 142. The gamma correction part 142 derives a compensation value corresponding to the luminance difference ΔL between the first and second pixel areas NML and UDC, and updates the digital gamma data by adding the compensation value to the initial gamma compensation data. Then, the gamma correction part 142 receives pixel data DATA and modulates the pixel data with digital gamma data and transmits it to the data driver 110. The data driver 110 converts the pixel data modulated by the gamma correction part 142 into a data voltage and outputs it to the data lines. As shown in FIG. 5, the data voltage range and maximum voltage of the second pixel area UDC outputted from the data driver 110 are larger than the data voltage range and maximum voltage of the second pixel area NML.

Figure 15:
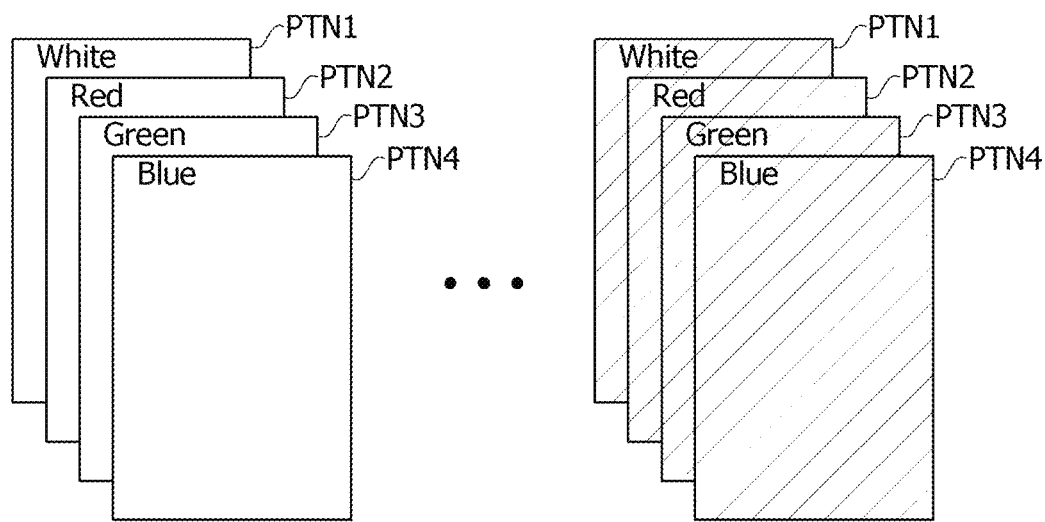
FIG. 15 is a diagram illustrating an example of a display pattern for driving pixels in a deterioration sensing mode.

FIG. 15 is a diagram illustrating an example of a display pattern for driving pixels in the deterioration sensing mode. The display pattern may be classified by color and classified by gray scale. For example, the display pattern may include a white pattern PTN1, a red pattern PTN2, a green pattern PTN3, and a blue pattern PTN4. The patterns PTN1, PTN2, PTN3, and PTN4 may occur for each gray scale, for example, gray scale 31 G31, gray scale 63 G63, gray scale 127 G127, and gray scale 255 G255, respectively. In the deterioration sensing mode, the display pattern data may be written to the pixels in a predetermined order.

Figure 16:
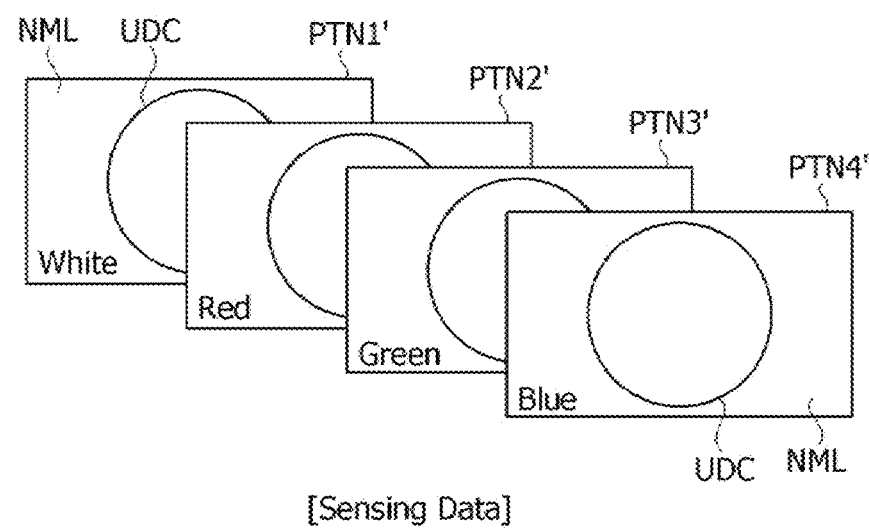
FIG. 16 is a diagram illustrating an example of sensing data outputted from an optical device in a deterioration sensing mode.

FIG. 16 is a diagram illustrating an example of sensing data outputted from the optical device 40 in the deterioration sensing mode. In FIG. 16, PTN1', PTN2', PTN3', and PTN4' are display patterns that are reproduced as images by inputting the sensing data into the display device.

Referring to FIG. 16, when the display pattern data is written to the pixels in the first and second pixel areas NML and UDC in the deterioration sensing mode, the sensing data outputted from the optical device 40 includes the luminance values of the pixels in the first and second pixel areas NML and UDC that are emitted within the sensing area SA as shown in FIG. 16.

Figure 17:
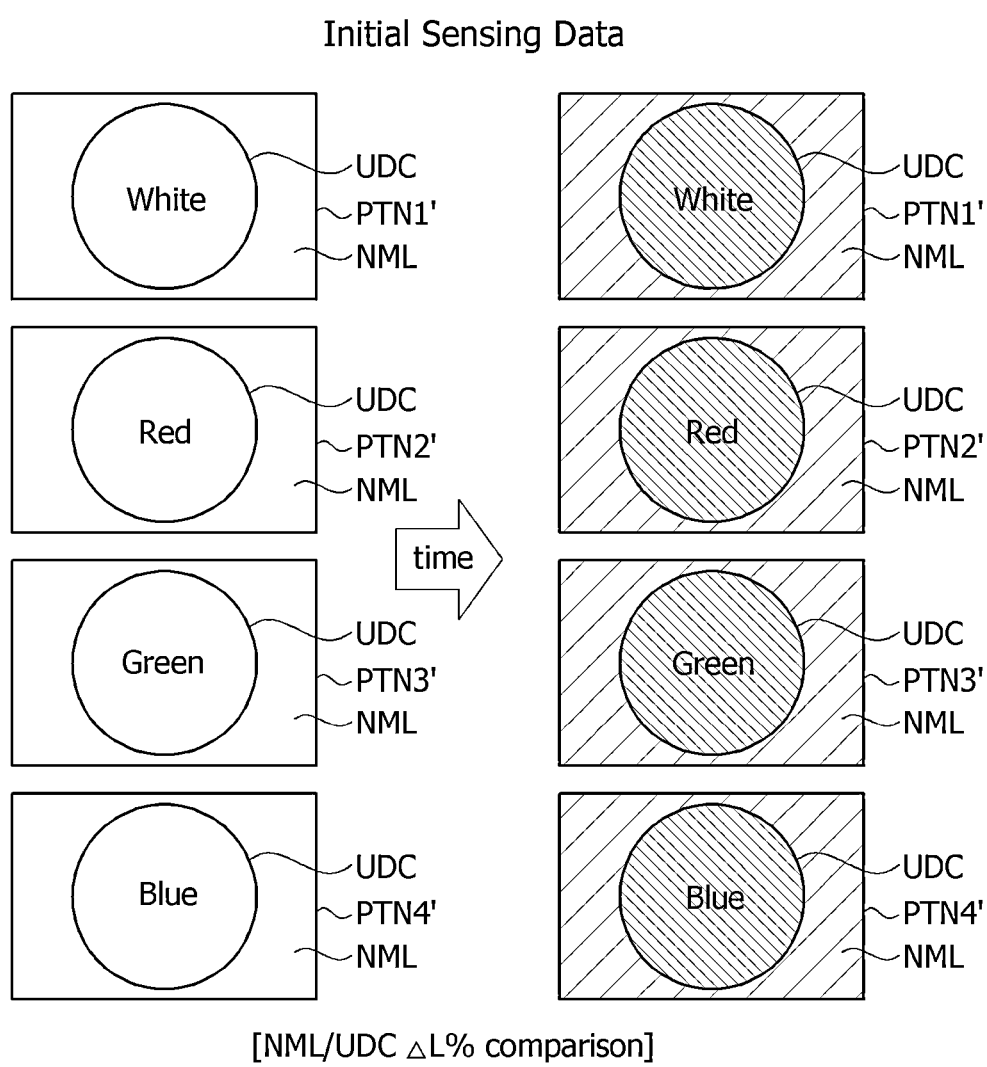
FIG. 17 is a diagram illustrating an initial value of sensing data and a current value thereof after pixel deterioration.

FIG. 17 is a diagram illustrating an initial value of sensing data and a current value thereof after pixel deterioration. Due to the difference in the luminance range and the maximum luminance value of the data voltages applied to the pixels in the first and second pixel areas NML and UDC, the deterioration progress rates of deterioration of the pixels in the first and second pixel areas NML and UDC are different. The pixels in the second pixel area UDC may deteriorate faster. As a result, the luminance difference ΔL between the first and second pixel areas NML and UDC may increase as the driving time of the pixels increases. The pixel deterioration compensation circuit of the present disclosure derives the compensation value to minimize the luminance difference ΔL between the first and second pixel areas NML and UDC measured each time the deterioration sensing mode is executed, thereby reducing the luminance difference ΔL between the first and second pixel areas NML and UDC even if the difference in the amount of pixel deterioration between the first and second pixel areas NML and UDC becomes larger.

Figure 18:
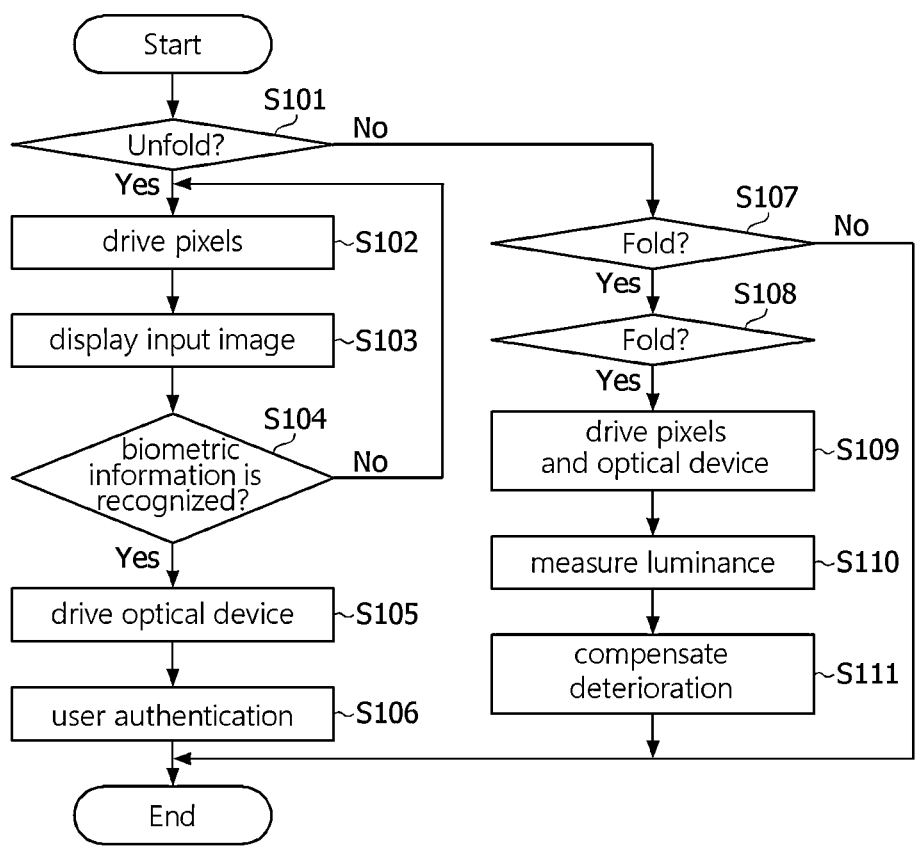
FIG. 18 is a flowchart illustrating a method of driving a display device according to one embodiment of the present disclosure.

FIG. 18 is a flowchart illustrating a method of driving the display device according to one embodiment of the present disclosure.

Referring to FIG. 18, when an input image is input to the display panel driver while the foldable display is not folded, all pixels of the pixel array are driven to display the input image (S101 to S103). In this case, not only the first and second pixel areas NML and UDC, but also the pixels in the third pixel area overlapping on the sensing area SA may be driven.

When an event requiring user authentication based on biometric information occurs, the optical devices 30 and 40 are driven to process the user authentication (S104 to S105). When a face recognition event occurs, the second optical device 30 overlapping the second pixel area UDC may be driven so that infrared light received from the face may be photoelectrically converted by the second optical device 30. When a fingerprint recognition event occurs, the first optical device 40 overlapping the third pixel area in the sensing area SA may be driven so that visible light reflected from a fingerprint on the sensing area SA may be photoelectrically converted by the first optical device 40.

When the foldable display is folded (S107), the pixels and the optical device 40 may be driven in the deterioration sensing mode to sense the pixel deterioration between the first and second pixel areas NML and UDC.

In the deterioration sensing mode, the pixel deterioration compensation circuit writes display pattern data to the pixels in the first and second pixel areas NML and UDC to drive the pixels. The pixel deterioration compensation circuit also drives the optical device 40 to measure the luminance of the first and second pixel areas NML and UDC in the deterioration sensing mode (S108 and S109). The pixel deterioration compensation circuit receives sensing data including luminance values of each of the first and second pixel areas NML and UDC from the optical device 40 to measure a luminance difference ΔL between the first and second pixel areas NML and UDC (S110). The pixel deterioration compensation circuit may compensate for the deterioration of each of the pixels of the first and second pixel areas NML and UDC by deriving the compensation value to minimize the luminance difference ΔL between the first and second pixel areas NML and UDC and updating the digital gamma data (S111).

Figure 19:
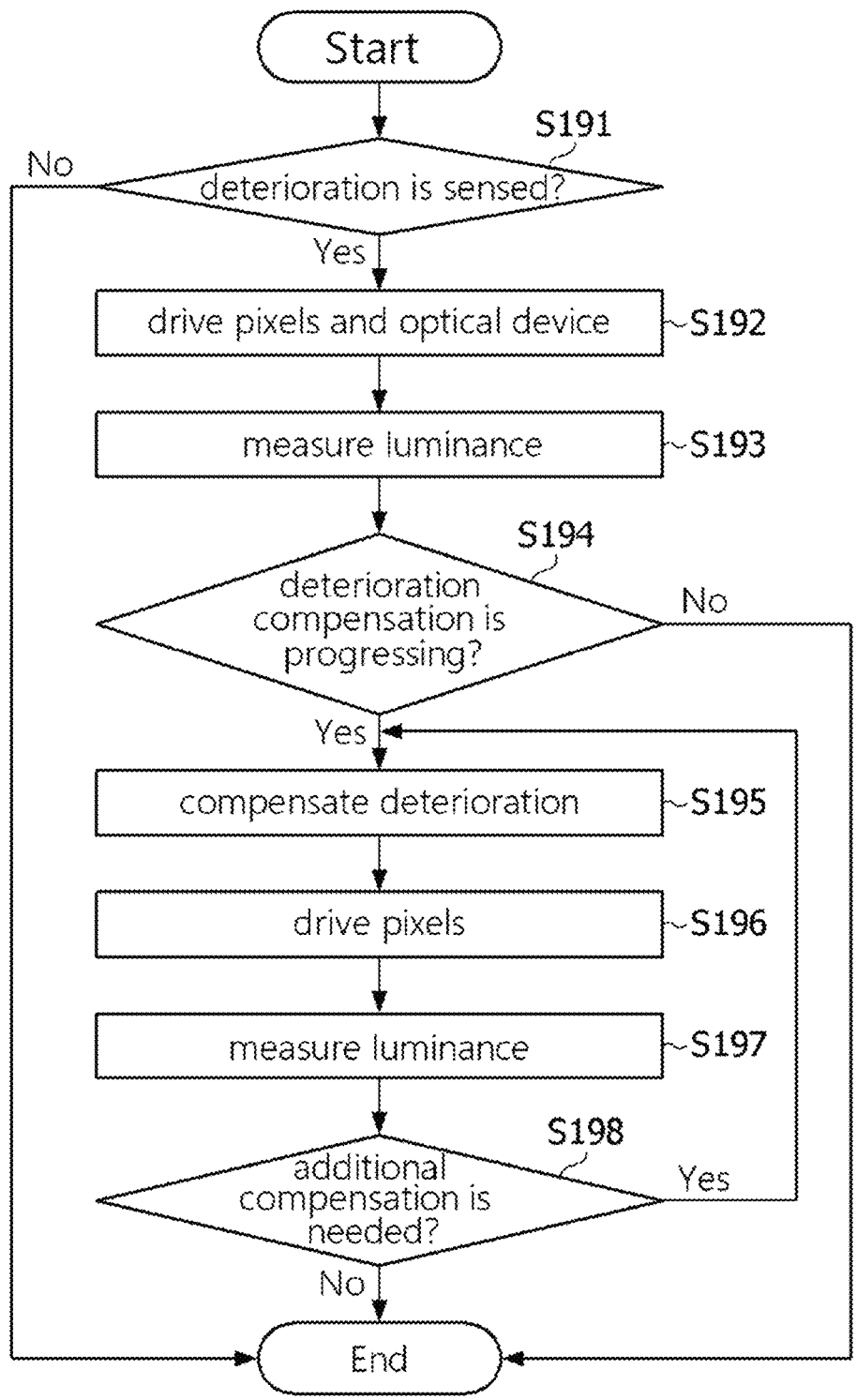
FIG. 19 is a flowchart illustrating a step-by-step control sequence of a deterioration compensation method of a display device according to one embodiment of the present disclosure.

FIG. 19 is a flowchart illustrating a step-by-step control sequence of a deterioration compensation method of a display device according to one embodiment of the present disclosure.

Referring to FIG. 19, the pixel deterioration compensation circuit writes the display pattern data to the pixels in the first and second pixel areas NML and UDC in the deterioration sensing mode to drive the pixels and drive the optical device 40 (S191 and S192).

The pixel deterioration compensation circuit receives from the optical device 40 sensor data including luminance values of the first and second pixel areas NML and UDC emitted by the display pattern data, and measures the luminance difference ΔL therebetween (S193). The pixel deterioration compensation circuit may compensate for the deterioration of the pixels in the first and second pixel areas NML and UDC by deriving the compensation value to minimize the luminance difference (ΔL) between the first and second pixel areas NML and UDC and updating the digital gamma data (S195).

After compensating for the deterioration of the pixels, the pixel deterioration compensation circuit writes the display pattern data into the pixels to drive the pixels, and measures the luminance difference ΔL between the first and second pixel areas NML and UDC again (S196 and S197).

In the pixel deterioration compensation circuit, the luminance difference ΔL between the first and second pixel areas NML and UDC is compared with the allowable value, and if the luminance difference ΔL between the first and second pixel areas NML and UDC exceeds the allowable value, for example, 2 [%] (S198), the digital gamma data is updated with the compensation value by repeatedly performing steps S195 to S198 until the luminance difference ΔL is equal to or less than the allowable value.

Figure 20:
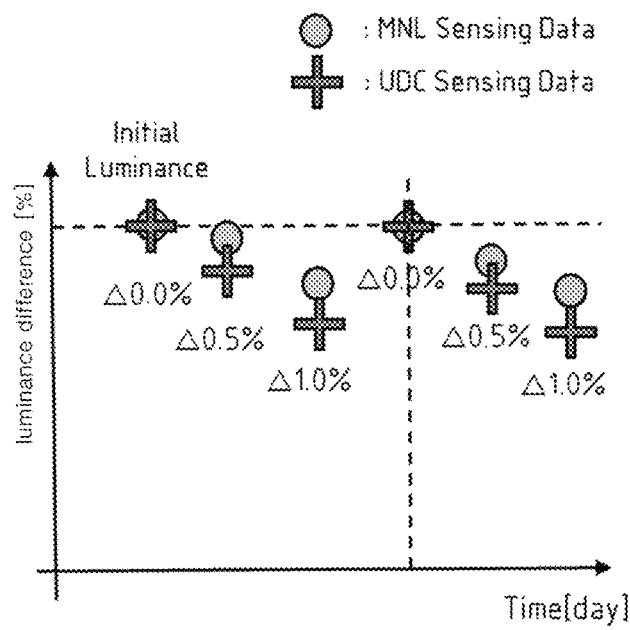
FIG. 20 is a diagram illustrating an example in which pixels in a first and second pixel areas are compensated.
Figure 21:
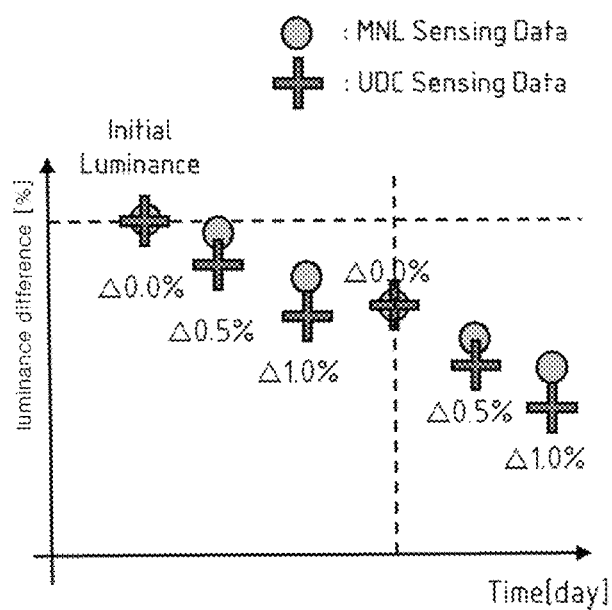
FIG. 21 is a diagram illustrating an example in which pixels in a second pixel area are compensated.

In the deterioration sensing mode, the pixels in the first and second pixel areas NML and UDC may be compensated, or the pixels in any one of the pixel areas NML and UDC may be compensated. FIG. 20 is an example in which the pixels in the first and second pixel areas NML and UDC are compensated. FIG. 21 is an example in which the pixels in the second pixel area UDC are compensated. As described above, the deterioration degree of the pixels may be compensated by modulating the pixel data using the digital gamma data (see FIGS. 22A and 22B) to which the compensation value is added, which is derived based on the luminance difference ΔL between the first and second pixel areas NML and UDC.

Figure 22A:
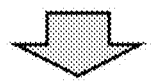
FIGS. 22A and 22B are diagrams illustrating an example of digital gamma data for compensating for pixel deterioration in a deterioration sensing mode.
Figure 22B:
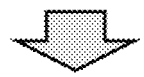

FIGS. 22A and 22B are diagrams illustrating an example of digital gamma data for compensating for the deterioration of pixels in the deterioration sensing mode. FIG. 22A is an example of digital gamma data of pixel data to be written to the pixels in the first pixel area NML. FIG. 22B is an example of digital gamma data of pixel data to be written to the pixels in the second pixel area UDC. In FIGS. 22A and 22B, the digital gamma data includes, but the present disclosure is not limited to, gamma compensation data for red, green, and blue sub-pixels in each of predetermined gray scales, such as gray scale 31 G31, gray scale 63 G63, gray scale 127 G127, and gray scale 255 G255. In FIGS. 22A and 22B, the letter in bold, derived from the luminance difference measurement is an example of the compensation value of the digital gamma data.

Referring to FIGS. 22A and 22B, the initial values of the digital gamma data for compensating the gamma characteristics of the second pixel area UDC are set to a higher value than that of the first pixel area NML in order to reduce the luminance difference caused by the PPI difference between the first and second pixel areas NML and UDC.

As the driving time of the first and second pixel areas NML and UDC elapses, the pixels in the second pixel area UDC may deteriorate faster than the pixels in the first pixel area NML. Therefore, the compensation value of the digital gamma data for the second pixel area UDC may be greater than the compensation value for the first pixel area NML because the amount of pixel deterioration in the second pixel area UDC is greater than the amount of pixel deterioration in the first pixel area NML.

It should be noted that the display device of the present disclosure is not limited to application to foldable displays. For example, it can also be applied to rollable displays or slidable displays, for example, displays in which their screen sizes can be varied using a flexible display panel 100 and rollers 231, as shown in FIG. 23.

Figure 23:
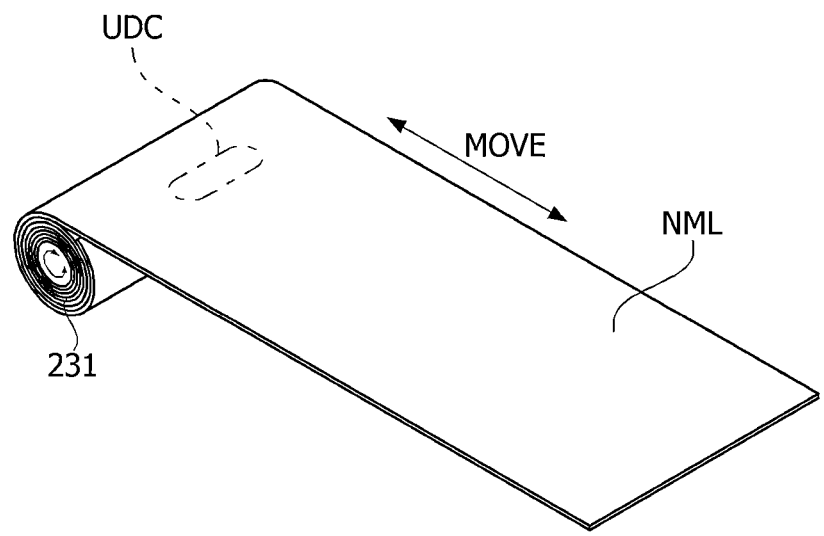
FIG. 23 is a diagram illustrating an example of a rollable display according to one embodiment of the present disclosure.
Figure 23:
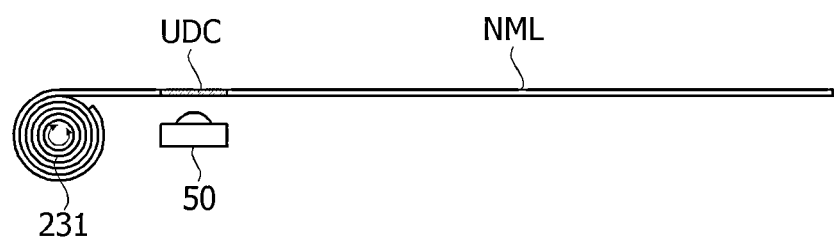

Referring to FIG. 23, the display of the present disclosure may further include a roller 231 on which the display panel 100 is wound. The roller 231 rotates in engagement with a motor driven by the host system 200. When the roller 231 is rotated in one direction, the screen of the display panel 100 may become larger, while when the roller 231 is rotated in the opposite direction, the screen of the display panel 100 may become smaller.

The display area of the display panel 100 includes a first pixel area NML and a second pixel area UDC having a relatively small PPI. The display device further includes an optical device 50 overlapping the display area to measure the luminance difference between the first and second pixel areas NML and UDC, and a pixel deterioration compensation circuit. The optical device 50 is disposed in a fixed sensing area. The pixel deterioration compensation circuit is substantially the same as in the preceding embodiment, so a detailed description thereof will be omitted.

The display panel 100 may be moved in an up-and-down direction or a left-and-right direction depending on the direction of rotation of the roller 231. When the display panel 100 is moved, the position of the optical device 50 is fixed, so the relative position of the second pixel area UDC with respect to the optical device 50 changes.

When the display panel 100 is moved, the first and second pixel areas NML and UDC may located in a position facing the sensing area. The pixel deterioration compensation circuit processes the pixel deterioration compensation method shown in FIG. 19 when the first and second pixel areas NML and UDC pass over the sensing area.

Figure 24A:
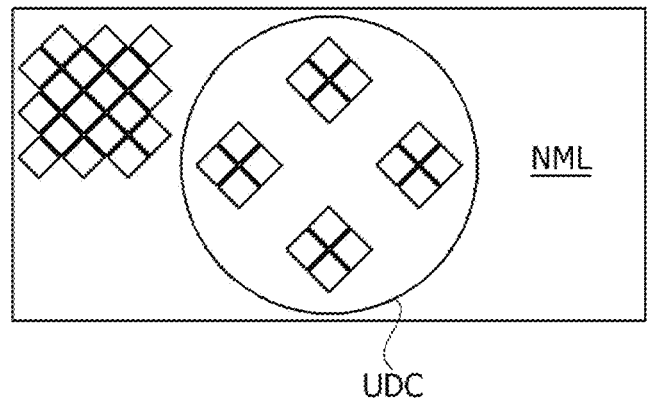
FIGS. 24A to 24C are diagrams illustrating images in which sensing data photoelectrically converted by an optical device in a sensing area of a rollable display is reproduced on a display device.
Figure 24B:
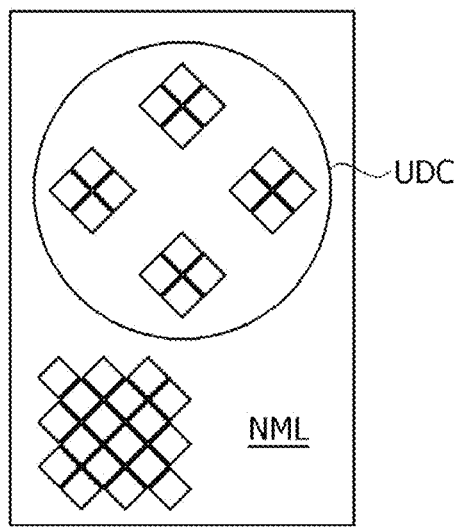
Figure 24C:
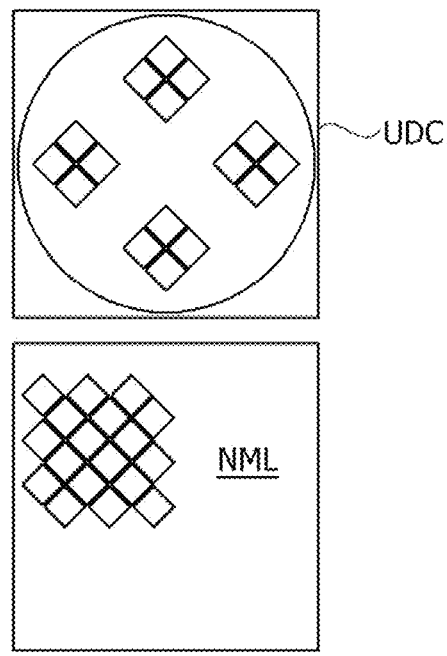

FIGS. 24A to 24C are diagrams illustrating images in which sensing data photoelectrically converted by the optical device 50 in a sensing area of a rollable display is reproduced on a display device. FIG. 24A is an example in which the luminance of pixels in the first and second pixel areas NML and UDC in the left and right directions in the sensing area are measured together. FIG. 24B is an example in which the luminance of pixels in the first and second pixel areas NML and UDC in the up and down directions in the sensing area are measured together. FIG. 24C is an example in which the luminance of the pixels in the first pixel area NML and the luminance of the pixels in the second pixel area UDC in the sensing area are measured with a time difference. The pixel deterioration compensation circuit may derive the compensation value on the basis of the result of measurement of the luminance difference between the first and second pixel areas NML and UDC using at least one of the methods of FIGS. 24A to 24C, thereby managing the luminance difference between the first and second pixel areas NML and UDC within an allowable value.

The objects to be achieved by the present disclosure, the means for achieving the objects, and advantages and effects of the present disclosure described above do not specify essential features of the claims, and thus, the scope of the claims is not limited to the disclosure of the present disclosure.

It will be apparent to those skilled in the art that various modifications and variations can be made in the display device, the method of compensating for deterioration thereof, and the mobile terminal including the display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display device, comprising:
   a display panel including a first pixel area, a second pixel area, and a third pixel area;
   a first optical device disposed below the display panel, the first optical device facing at least a portion of the first pixel area and at least a portion of the second pixel area when the display panel is in a folded state; and
   a pixel deterioration compensation circuit configured to compensate a luminance difference between a luminance value of the first pixel area and a luminance value of the second pixel area in a deterioration sensing mode.

2. The display device of claim 1, wherein a pixel density of the second pixel area is lower than a pixel density of the first pixel area, and
   a maximum data voltage for being applied to pixels in the second pixel area is higher than a maximum data voltage for being applied to pixels in the first pixel area.

3. The display device of claim 2, further comprising: a second optical device disposed below the second pixel area.

4. The display device of claim 1, wherein the third pixel area of the display panel overlaps with a sensing area,
   at least a portion of pixels in the third pixel area emit light when a fingerprint recognition event occurs, and
   none of the pixels in the third pixel area emit light in the deterioration sensing mode.

5. The display device of claim 1, wherein the display panel enters the deterioration sensing mode when the display panel is in the folded state.

6. The display device of claim 1, wherein, in a display mode, pixel data of an input image is written to pixels in the first pixel area, the second pixel area, and the third pixel area so that the input image is displayed on the display panel, and
   wherein, in the deterioration sensing mode, the pixels in the first pixel area and the second pixel area are written with predetermined display pattern data so that the pixels of the first pixel area and the second pixel area emit light.

7. The display device of claim 1, wherein the pixel deterioration compensation circuit includes:
   a luminance measurement part configured to receive the luminance value of the first pixel area and the luminance value of the second pixel area from the first optical device to determine the luminance difference between the luminance value of the first pixel area and the luminance value of the second pixel area; and
   a gamma correction part configured to derive a compensation value based on the luminance difference between the luminance value of the first pixel area and the luminance value of the second pixel area, and compensate the luminance difference between the luminance value of the first pixel area and the luminance value of the second pixel area by updating digital gamma data by adding the compensation value to initial gamma compensation data.

8. The display device of claim 7, wherein the gamma correction part is configured to:

modulate pixel data of an input image into the digital gamma data.

9. The display device of claim 8, further comprising:
a data driver configured to convert the pixel data modulated by the gamma correction part into a data voltage.

10. A method of compensating for deterioration of a display device, the method comprising:
driving pixels in a first pixel area and pixels in a second pixel area by writing display pattern data to the pixels in the first and second pixel areas while a display panel is folded;
driving an optical device disposed in a sensing area opposite the first pixel area and the second pixel area to measure a luminance value of the first pixel area and a luminance value of the second pixel area to determine a luminance difference between the luminance value of the first pixel area and the luminance value of the second pixel area;
deriving a compensation value based on the luminance difference between the luminance value of the first pixel area and the luminance value of the second pixel area; and
updating digital gamma data for pixels in at least one of the first pixel area and the second pixel area using the compensation value.

11. A mobile terminal, comprising:
a display panel including a first pixel area, a second pixel area, and a third pixel area;
a first optical device overlapping the third pixel area, the first optical device facing at least a portion of the first pixel area and at least a portion of the second pixel area when the display panel is in a folded state; and
a luminance difference compensation circuit configured to compensate a luminance difference between a luminance value of the first pixel area and a luminance value of the second pixel area,
wherein the first optical device is configured to measure the luminance value of the first pixel area and the luminance value of the second pixel area, and transmit the luminance value of the first pixel area and the luminance value of the second pixel area.

12. The mobile terminal of claim 11, wherein the first optical device includes at least one sensor pixel of an image sensor, an infrared sensor element or an illumination sensor element, and wherein the at least one sensor pixel is disposed below the display panel.

13. The mobile terminal of claim 11, wherein a pixel density of the second pixel area is lower than a pixel density of the first pixel area.

14. The mobile terminal of claim 11, wherein a maximum data voltage for being applied to pixels in the second pixel area is higher than a maximum data voltage for being applied to pixels in the first pixel area.

15. The mobile terminal of claim 11, wherein the luminance difference compensation circuit includes:
a luminance measurement part configured to receive the luminance value of the first pixel area and the luminance value of the second pixel area from the first optical device to measure the luminance difference between the luminance value of the first pixel area and the luminance value of the second pixel area; and
a gamma correction part configured to derive a compensation value based on the luminance difference between the luminance value of the first pixel area and the luminance value of the second pixel area, and compensate the luminance difference between the luminance value of the first pixel area and the luminance value of the second pixel area.

16. The mobile terminal of claim 15, wherein the gamma correction part is configured to compensate the luminance difference between the luminance value of the first pixel area and the luminance value of the second pixel area by updating digital gamma data by adding the compensation value to initial gamma compensation data.

17. The mobile terminal of claim 11, further comprising a second optical device disposed below the second pixel area.

18. The mobile terminal of claim 17, wherein the second optical device includes a camera.

19. The mobile terminal of claim 11, wherein the first optical device includes a fingerprint recognition sensor.

* * * * *